(12) United States Patent
Shimizu et al.

(10) Patent No.: US 10,866,472 B2
(45) Date of Patent: Dec. 15, 2020

(54) MOUNTING SUBSTRATE AND DISPLAY PANEL

(71) Applicant: SHARP KABUSHIKI KAISHA, Sakai (JP)

(72) Inventors: Yukio Shimizu, Sakai (JP); Shinzoh Murakami, Sakai (JP); Takeshi Horiguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 36 days.

(21) Appl. No.: 16/331,515

(22) PCT Filed: Sep. 7, 2017

(86) PCT No.: PCT/JP2017/032236
§ 371 (c)(1),
(2) Date: Mar. 7, 2019

(87) PCT Pub. No.: WO2018/051878
PCT Pub. Date: Mar. 22, 2018

(65) Prior Publication Data
US 2019/0204655 A1  Jul. 4, 2019

(30) Foreign Application Priority Data

Sep. 14, 2016 (JP) ................................. 2016-179487

(51) Int. Cl.
*G02F 1/13* (2006.01)
*G02F 1/1345* (2006.01)
*G02F 1/1333* (2006.01)

(52) U.S. Cl.
CPC ...... *G02F 1/13458* (2013.01); *G02F 1/13452* (2013.01); *G02F 1/133305* (2013.01)

(58) Field of Classification Search
CPC .............. H01L 27/124; H01L 27/1248; G02F 1/13458; G02F 1/133305; G02F 1/13542
See application file for complete search history.

(56) References Cited

U.S. PATENT DOCUMENTS

| 6,184,966 B1 | 2/2001 | Fujita et al. |
| 6,323,931 B1 | 11/2001 | Fujita et al. |
| 6,683,662 B2 | 1/2004 | Fujita et al. |

(Continued)

FOREIGN PATENT DOCUMENTS

| CN | 101221959 A | 7/2008 |
| CN | 105489121 A | 4/2016 |

(Continued)

*Primary Examiner* — Latanya N Crawford Eason
(74) *Attorney, Agent, or Firm* — ScienBiziP, P.C.

(57) ABSTRACT

An array substrate includes at least: a glass substrate on which a driver is mounted; a panel side output terminal disposed in a mounting area of the glass substrate and connected to the driver; a first terminal portion; a gate insulation film including a first contact hole at a position overlapping a first terminal portion; a second terminal portion disposed to overlap at least a first contact hole and an opening edge of the first contact hole; a first interlayer insulation film including a second contact hole at a position overlapping a second terminal portion not to overlap the first contact hole; and a third terminal portion disposed to overlap at least the second contact hole and an opening edge of the second contact hole.

14 Claims, 31 Drawing Sheets

(56) References Cited

U.S. PATENT DOCUMENTS

| | | | |
|---|---|---|---|
| 7,592,701 B2 | 9/2009 | Takano et al. | |
| 8,067,775 B2 * | 11/2011 | Miyairi | H01L 29/7869 |
| | | | 257/72 |
| 8,377,762 B2 * | 2/2013 | Eguchi | H01L 27/12 |
| | | | 438/155 |
| 9,651,836 B2 | 5/2017 | Kita et al. | |
| 9,754,974 B2 * | 9/2017 | Yamazaki | H01L 29/66969 |
| 9,899,422 B2 * | 2/2018 | Lee | H01L 27/1225 |
| 10,281,752 B2 * | 5/2019 | Kim | G02F 1/1309 |
| 2002/0053667 A1 | 5/2002 | Fujita et al. | |
| 2006/0012744 A1 * | 1/2006 | Wang | G02F 1/13452 |
| | | | 349/151 |
| 2006/0157844 A1 | 7/2006 | Takano et al. | |
| 2008/0128699 A1 | 6/2008 | Seong et al. | |
| 2011/0012123 A1 | 1/2011 | Seong et al. | |
| 2015/0116618 A1 | 4/2015 | Kita et al. | |
| 2016/0085107 A1 * | 3/2016 | Morita | G02F 1/136227 |
| | | | 257/59 |
| 2016/0100483 A1 * | 4/2016 | Hwang | H05K 1/0298 |
| | | | 313/505 |
| 2016/0278201 A1 * | 9/2016 | Cheon | H01L 27/3297 |
| 2017/0104008 A1 * | 4/2017 | Takenaka | G02F 1/13452 |

FOREIGN PATENT DOCUMENTS

| | | |
|---|---|---|
| JP | H11-133452 A | 5/1999 |
| JP | 2004-184740 A | 7/2004 |
| JP | 2006-189484 A | 7/2006 |
| JP | 2008-203593 A | 9/2008 |
| JP | 2015-087434 A | 5/2015 |
| WO | 2013/128857 A1 | 9/2013 |

* cited by examiner

MOUNTING SUBSTRATE AND DISPLAY PANEL

TECHNICAL FIELD

The present invention relates to a mounting substrate and a display panel.

BACKGROUND ART

As an example of a liquid crystal panel used for a conventional liquid crystal display device, ones described in the following Patent Literature 1 are known. In a TFT substrate constituting a liquid crystal panel described in the Patent Literature 1, a plurality of data drivers that drive a plurality of data lines arranged in an image display area are formed, the data drivers are electrically connected to a metal wiring formed on the TFT substrate in an area that overlaps with the data drivers in the TFT substrate in a plan view, the metal wiring is electrically connected via a contact hole to a lead wire formed on a layer different from the metal wiring on the TFT substrate in the area, and the lead wire is extended outside of the area and electrically connected to the data lines.

RELATED ART DOCUMENT

Patent Literature

Patent Literature 1
JP 2015-87434 A

Problem to be Solved by the Invention

Now, among the lead wires arranged on the TFT substrate, a terminal that is a part connected to an output terminal of the data driver tends to increase in the number of installation accompanying, for instance, a progress to higher definition, furthermore, accompanying a progress to narrower bezel or higher functionality, an area that overlaps with the data driver of the TFT substrate tends to be narrower. Therefore, in recent years, it has been demanded to make a formation width and an arrangement clearance of a terminal narrower.

DISCLOSURE OF THE PRESENT INVENTION

The present invention is completed based on a situation as described above and intends to make a formation area of the terminal smaller.

Means for Solving the Problem

Amounting substrate includes at least: a substrate on which a mounting component is mounted; at least one terminal that is disposed in a mounting area of the substrate in which the mounting component is mounted and connected to the mounting component; a first terminal portion that is made of a first conductive film disposed on the substrate and included in the at least one terminal; a first insulation film that is disposed on an upper layer side of the first conductive film and includes a first contact hole at a position overlapping the first terminal portion; a second terminal portion that is made of a second conductive film disposed on an upper layer side of the first insulation film, included in the terminal, disposed to overlap at least the first contact hole and an opening edge of the first contact hole, and connected to the first terminal portion via the first contact hole; a second insulation film disposed on an upper layer side of the second conductive film and including a second contact hole at a position overlapping the second terminal portion and not overlapping the first contact hole; and a third terminal portion that is made of a third conductive film disposed on an upper layer side of the second insulation film and constitutes the terminal to overlap at least the second contact hole and an opening edge of the second contact hole and connected to the second terminal portion via the second contact hole.

According to the configuration, when the mounting component is mounted on the substrate in the mounting area of the substrate, the mounting component is connected to a terminal disposed in the mounting area. The terminal is configured such that the second terminal portion made of the second conductive film is connected to the first terminal portion via the first contact hole in the first insulation film and the third terminal portion made of the third conductive film is connected to the second terminal portion via the second contact hole in the second insulation film. The first terminal portion is made of the first conductive film.

Since the second terminal portion is disposed to overlap at least the first contact hole and the opening edge of the first contact hole, even when a position of the second terminal portion slightly varies relative to the first contact hole from the production reasons, the second terminal portion may be inserted in an entire area of the first contact hole, thus, a contact surface between the first terminal portion and the second terminal portion is constant. Similarly, since the third terminal portion is disposed to overlap at least the second contact hole and the opening edge of the second contact hole, a connection area between the second terminal portion and the third terminal portion is constant.

With the configuration described above and the second contact hole at the position not overlapping the first contact hole, an overlapping amount of the second terminal portion relative to the opening edge of the first contact hole in the first insulation film may be arbitrary set irrespective of the opening edge of the second contact hole in the second insulation film. That is, in the case where the second contact hole is tentatively arranged on a position overlapping with the first contact hole, it is necessary to take care such that an opening edge of the second contact hole in the second insulation film does not overlap on a step site generated when the second terminal portion inserted to the first contact hole rides on the opening edge of the first contact hole in the first insulation film, specifically, it is necessary to secure an abundant overlapping amount of the second terminal portion relative to the opening edge of the first contact hole in the first insulation film. By contrast therewith, when the second contact hole is arranged at a position that does not overlap the first contact hole, an overlapping amount of the second terminal portion to the opening edge of the first contact hole in the first insulation film can be made slight. Thereby, a forming area of a terminal is made smaller.

As an embodiment of the present invention, following constitutions are preferable.

(1) The terminal has an elongated shape, and the first insulation film and the second insulation film are formed such that the first contact hole and the second contact hole are along a longitudinal direction of the terminal. When thus implementing, of a direction orthogonal to an arrangement direction of the first contact hole and the second contact hole, that is, of a shorter direction orthogonal to the longitudinal direction in the terminal, a formation area of the terminal may be made smaller. Accordingly, in the case where an arrangement of arranging a plurality of terminals along a shorter direction is adopted, an arrangement clearance between terminals may be made smaller.

(2) The first terminal portion is disposed to overlap the second contact hole. If a first terminal portion is disposed without overlapping a second contact hole, because a part overlapping the second contact hole of a second terminal portion and a third terminal portion becomes lower by an amount of a film thickness of a first metal film, there is a care that a step site may be formed abundant in the second terminal portion and the third terminal portion. With respect to the point, with the first terminal portion disposed to overlap the second contact hole, flatness of the second terminal portion and third terminal portion may be secured.

(3) The third terminal portion is disposed to overlap the first contact hole. In this manner, compared with a case where the third terminal portion is tentatively disposed not to overlap the first contact hole, a formation area of the third terminal portion may be secured wider. Accordingly, when a constitution where a mounting component is connected to, for instance, the third terminal portion is adopted, since a connection area of the terminal to the mounting component may be sufficiently secured, the electric resistance between the mounting component and the terminal may be reduced.

(4) The first conductive film and the second conductive film each are formed into a metal film, the third conductive film is formed into a transparent electrode film, and the first insulation film and the second insulation film are formed such that an opening area of the second contact hole becomes larger than an opening area of the first contact hole. Each of the first conductive film and second conductive film is formed into a metal film, and in the constitution where the third conductive film is formed into a transparent electrode film, when all the contact areas are same, the electric resistance between the first terminal portion and second terminal portion becomes smaller than the electric resistance between the second terminal portion and third terminal portion. By contrast, as was described above, since the opening area of the second contact hole is formed larger than the opening area of the first contact hole, the contact area between the first terminal portion and second terminal portion, which have intrinsically small electric resistance may be stayed small, and by its part the contact area between the second terminal portion and third terminal portion, which have intrinsically large electric resistance may be secured large. Thus, the electric resistance of the terminal may be reduced.

(5) The first insulation film and the second insulation film are formed such that at least any one of the first contact hole and the second contact hole includes division contact holes arranged at intervals. In this manner, at least any one of the second terminal portion and third terminal portion is connected to at least any one of the first terminal portion and second terminal portion via the division contact holes arranged at intervals. In at least any one of the second terminal portion and third terminal portion, since a part located between parts that are inserted to each division contact hole is arranged on an upper layer side of a part intervening between adjacent division contact holes of at least any one of the first insulation film and second insulation film, the flatness of a surface is secured as a whole.

(6) The mounting substrate further includes at least: a third insulation film disposed on an upper layer side of the third conductive film and including a third contact hole at a position overlapping the third terminal portion; and a fourth terminal portion that is made of a fourth conductive film disposed on an upper layer side of the third insulation film, included in the terminal, disposed to overlap the third contact hole and an opening edge of the third contact hole, and connected to the third terminal portion via the third contact hole. In the terminal, not only the first terminal portion, the second terminal portion, and the third terminal portion are connected to one another, the fourth terminal portion made of the fourth conductive film is connected to the third terminal portion via the third contact hole in the third insulation film.

(7) The first insulation film, the second insulation film and the third insulation film are formed such that the first contact hole, the second contact hole and the third contact hole do not overlap one another. In the case where the first contact hole, the second contact hole and the third contact hole are temporarily arranged at positions that do not overlap one another, a care must be taken such that an opening edge of the second contact hole in the second insulation film does not overlap a step site generated when the second terminal portion inserted to the first contact hole rides on an opening edge of the first contact hole in the first insulation film, a care must be taken such that an opening edge of the third contact hole in the third insulation film does not overlap a step site generated when the third terminal portion inserted into the second contact hole rides on an opening edge of the second contact hole in the second insulation film, specifically, an overlapping amount of the second terminal portion to the opening edge of the first contact hole in the first insulation film and an overlapping amount of the third terminal portion to the opening edge of the second contact hole in the second insulation film each have be secured abundantly. Compared therewith, when the first contact hole, the second contact hole, and the third contact hole are disposed not to overlap one another, an overlapping amount of the second terminal portion to an opening edge of the first contact hole in the first insulation film and an overlapping amount of the third terminal portion to an opening edge of the second contact hole in the second insulation film may be reduced, respectively. Thus, a formation range of a terminal formed of the first terminal portion, the second terminal portion, the third terminal portion, and the fourth terminal portion is made smaller.

(8) The first conductive film and the second conductive film are metal films. The third conductive film and the fourth conductive film are transparent electrode films. The first insulation film, the second insulation film, and the third insulation film are formed such that an opening area of the first contact hole is the smallest, and an opening area of the third contact hole is the largest. In a constitution where the first conductive film and the second conductive film each are formed into a metal film, and the third conductive film and the fourth conductive film each are formed into a transparent electrode film, when all the contact areas are same, the electric resistance between the first terminal portion and the second terminal portion becomes minimum, and the electric resistance between the third terminal portion and the fourth terminal portion becomes maximum. By contrast, since the opening area of the first contact hole becomes minimum and an opening area of the third contact hole becomes maximum as was described above, by making the contact area between the first terminal portion and the second terminal portion, which have intrinsically small electric resistance stay at a minimum limit, by that portion, a contact area between the third terminal portion and fourth terminal portion, which have intrinsically large electric resistance may be secured to a maximum limit. Thus, the electric resistance of the terminal may be reduced.

(9) The third insulation film is formed such that the third contact hole overlaps at least the second contact hole. In this manner, if compared with a case where a first contact hole, a second contact hole and a third contact hole are arranged in one row not so as to overlap with each other, a formation area of the terminal in an arrangement direction of the first contact hole and second contact hole may be made smaller.

(10) The third conductive film and the fourth conductive film are formed transparent electrode films. The third insulation film is formed such that the third contact hole overlap the first contact hole. In a constitution where the third conductive film and fourth conductive film each are formed into a transparent electrode film, the electric resistance between the third terminal portion and fourth terminal portion tends to be larger. With respect to the point, as was described above, when the third contact hole overlaps not only the second contact hole but also the first contact hole, a contact area of the fourth terminal portion to the third terminal portion becomes large, thus, the electric resistance regarding the terminal may be reduced.

(11) The terminal includes an input terminal for inputting a signal into the mounted component and an output terminal for outputting the signal from the mounted component. At least the output terminal includes at least the first terminal portion, the second terminal portion and the third terminal portion. The output terminal for outputting the signal from the mounted component tends to be required to make installation number many accompanying an increase in the number of signals to be output in comparison with the input terminal. Therefore, by constituting the output terminal at least from a first terminal portion, a second terminal portion and a third terminal portion, a formation area of the output terminal may be made small to be preferable from the viewpoint of increasing an installation number of the output terminals.

Next, in order to solve the above problems, a display panel of the present invention includes the mounting substrate described above, and a counter substrate disposed to face the mounting substrate. According to a display panel having a constitution like this, a formation area of the terminal is made small to be preferable from the viewpoint of achieving high definition of an image to be displayed.

Advantageous Effect of Invention

According to the present invention, a formation area of a terminal may be made small.

BEST MODE FOR CARRYING OUT THE INVENTION

First Embodiment

First embodiment of the present invention will be described with reference to FIG. 1 to FIG. 10. In the present embodiment, a liquid crystal panel 11 and an array substrate (mounting substrate) 11b provided to a liquid crystal display device 10 are exemplified. Incidentally, in a part of each drawing, an X-axis, a Y-axis and a Z-axis are shown, and each axis direction is depicted so as to be a direction shown in each drawing. Furthermore, regarding a vertical direction, with from FIG. 2, FIG. 4, FIG. 8 to FIG. 10 set to as a basis, with an upper side of the same drawing set to a front side, and a lower side of the same drawing is set to a back side.

Figure 1:
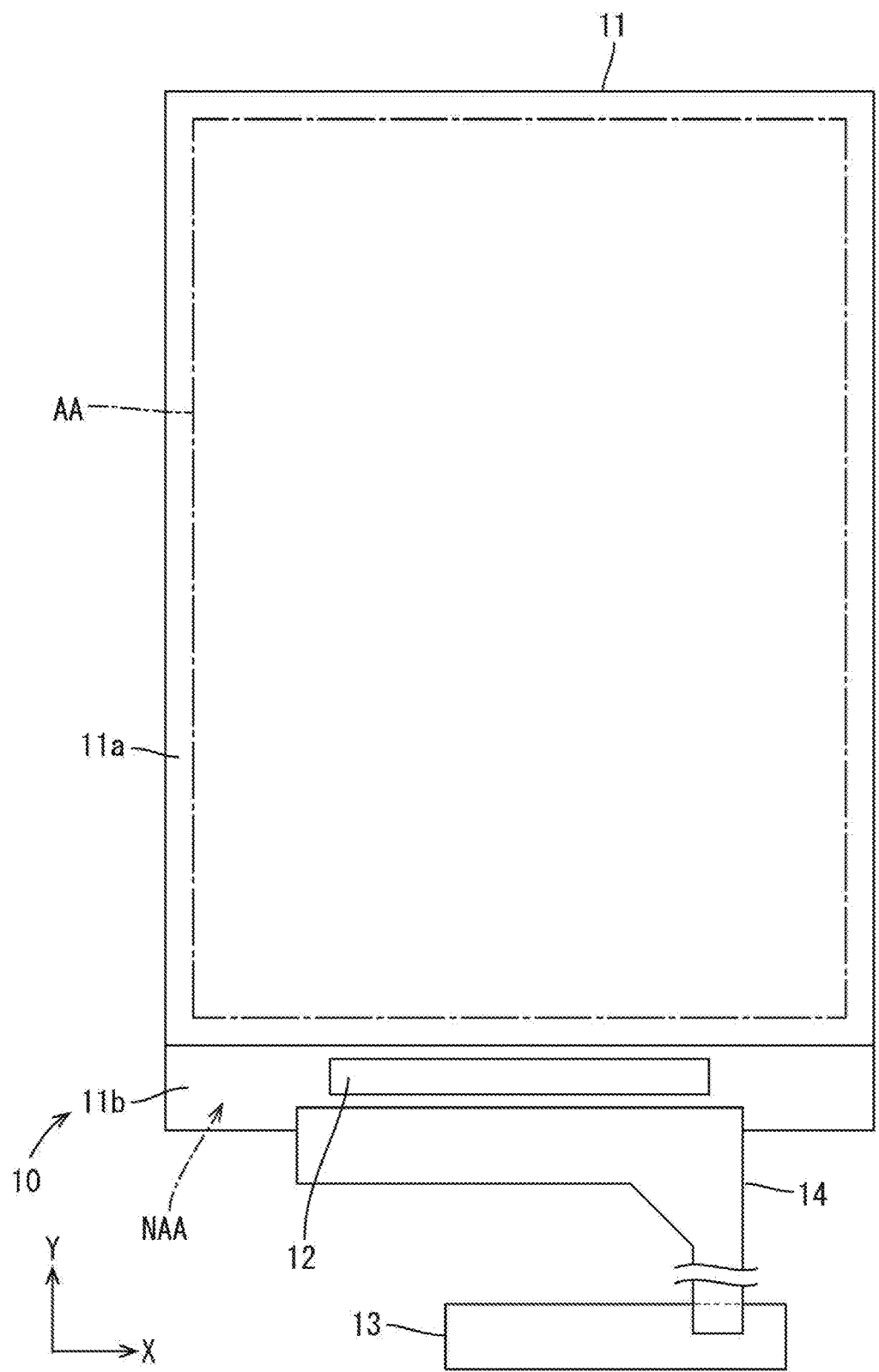
FIG. 1 is a schematic plan view showing a connection constitution between a liquid crystal panel on which a driver related to first embodiment of the present invention is mounted, a flexible substrate and a control circuit board.

As shown in FIG. 1, the liquid crystal display device 10 includes, at least, a liquid crystal panel 11 capable of displaying an image; a driver (mounted component, panel-driving component) 12 for driving the liquid crystal panel 11; a control circuit board (external signal supply source) 13 for supplying various kinds of input signals from the outside to the driver 12; a flexible substrate (mounted component) 14 electrically connecting the liquid crystal panel 11 and the external control circuit board 13; and a back-light device (not shown in the drawing) that is arranged on a back side to the liquid crystal panel 11 and irradiate light for displaying on the liquid crystal panel 11. In the liquid crystal display device 10, a screen size of the liquid crystal panel 11 is generally categorized into a small type and is preferable for applications such as smartphones and so on. Incidentally, categorization of specific screen sizes of the liquid crystal panel 11 and specific applications of the liquid crystal display device 10 may be properly changed to other than the above.

As shown in FIG. 1, the liquid crystal panel 11 is formed into a vertically long square shape (rectangular shape) as a whole, and its plate surface is divided into a display area (active area) AA that can display an image and is arranged on a center side, and a non-display area (non-active area) NAA that is arranged on an outer periphery side in the form of surrounding the display area AA and forms a frame shape (bezel shape) in a plan view. A short side direction in the liquid crystal panel 11 coincides with an X-axis direction of each drawing, a longer-side direction coincides with a Y-axis direction of each drawing, and a plate thickness direction coincides with a Z-axis direction. Incidentally, in FIG. 1 and FIG. 6, a chain line expresses a contour of the display area AA, and an area outside than the chain line is a non-display area NAA.

Figure 2:
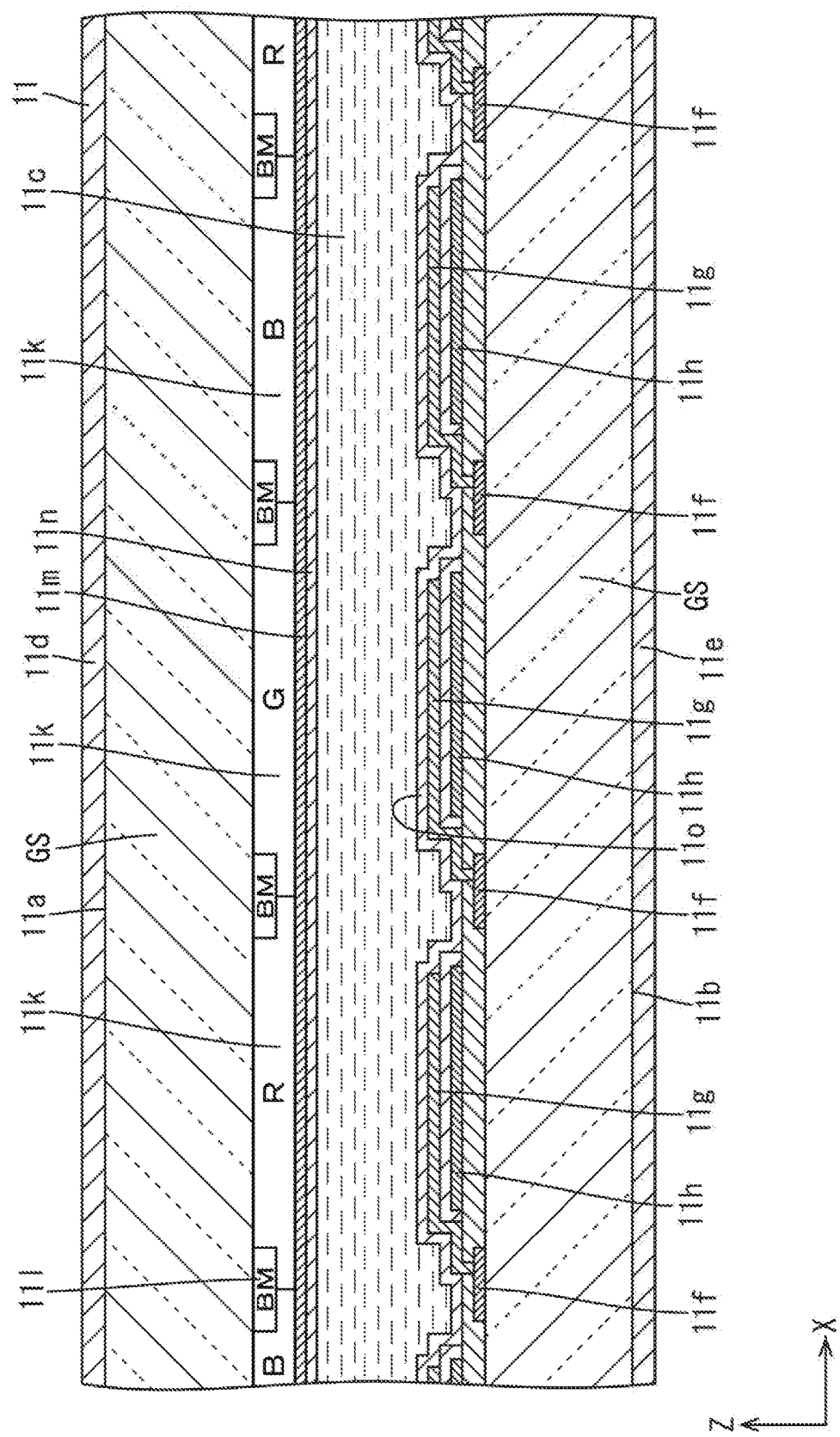
FIG. 2 is a schematic cross-sectional view showing a cross-sectional constitution in a display area of a liquid crystal panel.

As shown in FIG. 2, the liquid crystal panel 11 includes at least a pair of substrates 11a, 11b, and a liquid crystal layer (internal space) 11c that is sandwiched between both substrates 11a, 11b and contains liquid crystal molecules that are a substances of which optical characteristics vary as an electric field is applied. The pair of substrates 11a, 11b are sealed in a state of maintaining a cell gap of a thickness part of the liquid crystal layer 11c by a seal part (not shown in the drawing) interposed in the form of surrounding the liquid crystal layer 11c. A surface side (front surface side) of the pair of substrates 11a, 11b is formed into a CF substrate (substrate, counter substrate) 11a, and a back side (rear surface side) is made into an array substrate (one substrate, active matrix substrate) 11b. Both the CF substrate 11a and array substrate 11b are formed by laminating/forming various kinds of films on an internal surface side of a glass substrates (substrate) GS. Incidentally, on outer surface sides of both substrates 11a, 11b, polarization plates 11d, 11e are adhered, respectively.

Figure 3:
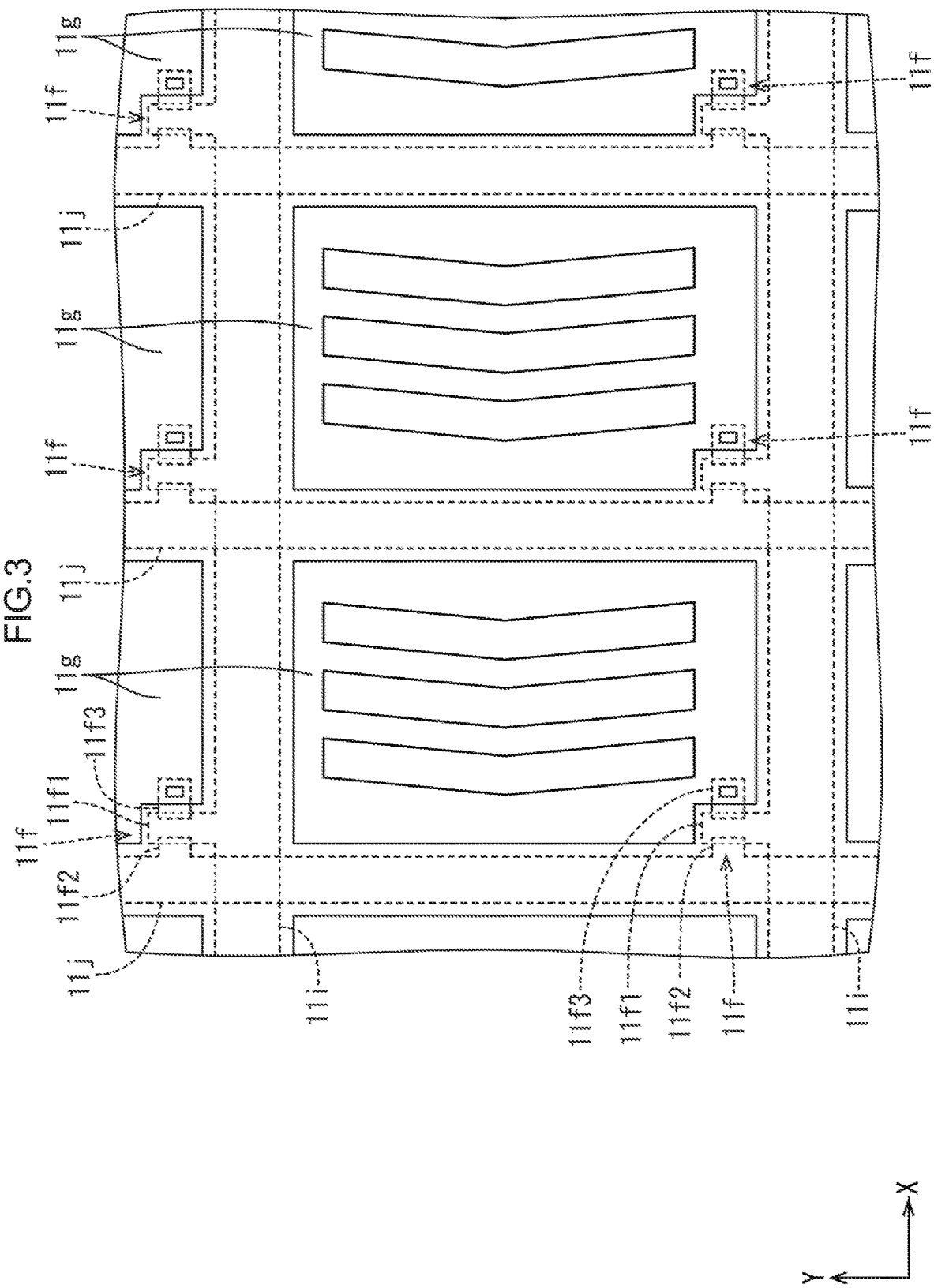
FIG. 3 is a plan view schematically showing a wiring constitution in a display area of an array substrate constituting the liquid crystal panel.

As shown in FIG. 2 and FIG. 3, in a display area AA on an inner surface side of the array substrate 11b (liquid crystal layer 11c side, a counter surface side with the CF substrate 11a), many TFTs (Thin Film Transistor: display element) 11f that are a switching element and pixel electrodes 11g are provided in juxtaposition in a matrix (matrix shape), and, in the surrounding of these TFTs 11f and pixel electrodes 11g, gate lines (scanning lines) 11i and source lines (data line, signal line) 11j that form a lattice shape are provided so as to surround. The gate line 11i and source line 11j are connected to the gate electrode 11f1 and source electrode 11f2 of the TFT 11f, respectively, and the pixel electrode 11g is connected to a drain electrode 11f3 of the TFT 11f. Then, the TFT 11f is driven based on various kinds of signals supplied respectively to the gate line 11i and source line 11j, and accompanying its drive, supply of potential to the pixel electrode 11g is controlled. The pixel electrode 11g is arranged in a square area surrounded by the gate line 11i and source line 11j. Furthermore, on an inner surface side of the display area AA of the array substrate 11b, a common electrode 11h made of a solid pattern in the form of overlapping with the pixel electrode 11g is formed on a lower layer side than the pixel electrode 11g. When a potential difference is generated between these overlapping pixel electrode 11g and common electrode 11h, in the liquid crystal layer 11c, in addition to a component along a plate surface of the array substrate 11b, a fringe electric field (oblique electric field) containing a component in a normal line direction to the plate surface of the array substrate 11b is applied. That is, a liquid crystal panel 11 according to the present embodiment has an operation mode of a FFS (Fringe Field Switching) mode. Incidentally, in the present embodiment, in each drawing, an extending direction of the gate line 11i and an extending direction of the source line 11j coincide with an X-axis direction and a Y-axis direction, respectively.

As shown in FIG. 2, on the other hand, on an internal surface side of the display area AA of the CF substrate 11a, at a position that forms a counter shape with each pixel electrode 11g of the array substrate 11b side, many color filters 11k are provided in a matrix in juxtaposition. In the color filter 11k, colored films of tree colors of R (red), G (green) and B (blue) are arranged in juxtaposition by repeating in a predetermined order. Between the respective color filters 11k, a lattice-shaped light shielding film (black matrix) 11l is formed to prevent mixed color. The light shielding film 11l is arranged so as to overlap with the gate line 11i and source line 11j in a plan view. On a surface of the color filter 11k and light shielding film 11l, an overcoat film 11m is provided. Furthermore, on a surface of the overcoat film 11m, a photo-spacer not shown in the drawing is provided. Incidentally, in the present liquid crystal panel 11, one display pixel that is a display unit is constituted by a pair of the colored film of three colors of R, G and B in color filter 11k and three pixel electrodes 11g facing therewith. The display pixel is formed of a red pixel having a color filter 11k of R, a green pixel having a color filter 11k of G, and a blue pixel having a color filter of B. Display pixels of these respective colors constitute a display pixel group by arranging in juxtaposition by repeating along a row direction (X-axis direction) in a plane surface of the liquid crystal panel 11, and many display pixel groups are arranged in juxtaposition along a column direction (Y-axis direction). Furthermore, as a layer that is positioned in an inner most side (neat the liquid crystal layer 11c) of both substrates 11a, 11b and comes into contact with the liquid crystal layer 11c, orientation films 11n, 11o for orienting liquid crystal molecules contained in the liquid crystal layer 11c are formed, respectively.

Figure 4:
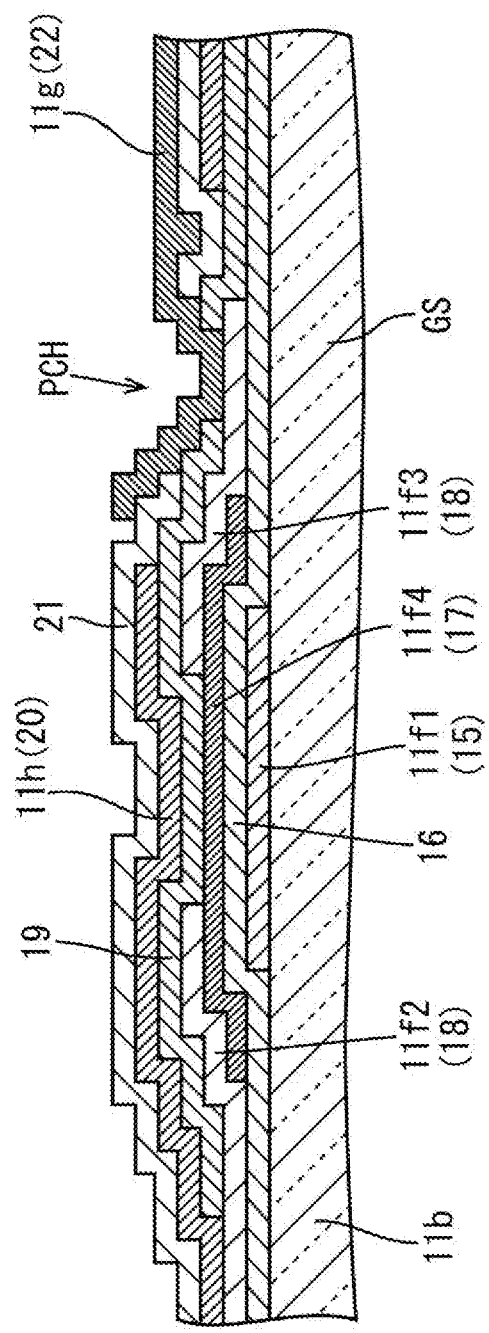
FIG. 4 is a cross-sectional view of a TFT in the display area of an array substrate.

Subsequently, various kinds of films laminated and formed on an inner surface side of array substrate 11b will be described. As shown in FIG. 4, on the array substrate 11b, sequentially from a lower layer side (a glass substrate GS side, a side far from the liquid crystal layer 11c), a first metal film (first conductive film, metal film) 15, a gate insulation film (first insulation film) 16, a semiconductor film 17, a second metal layer (second conductive film, metal film) 18, a first interlayer insulation film (second insulation film) 19, a first transparent electrode film (third conductive film, transparent electrode film) 20, a second interlayer insulation film (third insulation film) 21, a second transparent electrode film (fourth conductive film, transparent electrode film) 22, and an orientation film 11o are laminated and formed.

The first metal film 15 is formed into a laminate film formed by laminating metal materials of different kinds or into a single layer film made of one kind of metal material, and, as shown in FIG. 3 and FIG. 4, constitutes a gate line 11i or a gate electrode 11f1 of the TFT 11f. The gate insulation film 16 is made of an inorganic material and maintains the first metal film 15 on a lower layer side, a semiconductor film 17 and second metal film 18 on an upper layer side in an insulation state. The semiconductor film 17 is formed of a thin film that uses an oxide semiconductor, for instance, as a material and constitutes a channel part 11f4 connected to a source electrode 11f2 and a drain electrode 11f3 in the TFT 11f. The second metal film 18 is, in the same manner as the first metal film 15, formed into a laminate film or a single layer film and constitutes the source line 11j or the source electrode 11f2 and drain electrode 11f3 of the TFT 11f. In the present embodiment, the second metal film 18 is formed from the same material as the first metal film 15 and into the same structure. The first interlayer insulation film 19 is made of an inorganic material and maintains the second metal film 18 on a lower layer side and the first transparent electrode film 20 on an upper layer side in an insulation state. The first transparent electrode film 20 is formed of a transparent electrode material such as, for instance, IZO (Indium Zinc Oxide) and constitutes a common electrode 11h. The second interlayer insulation film 21 is made of an inorganic material and maintains the first transparent electrode film 20 on a lower layer side and the second transparent electrode film 22 on the upper layer side in an insulation state. The second transparent electrode film 22 is made of a transparent electrode material (for instance, ITO (Indium Zinc Oxide) or the like) different from the first transparent electrode film 20 described above and constitutes the pixel electrode 11g. In the first interlayer insulation film 19 and second interlayer insulation film 21, a pixel contact hole PCH is opened and formed for connecting the pixel electrode 11g made of the second transparent electrode film 22 to the drain electrode 11f3 made of the second metal film 18. Excluding the pixel contact hole PCH, the first interlayer insulation film 19 and second interlayer insulation film 21 are formed in solid, at least, over an entire area of the display area AA. The orientation film 11o is arranged in the form of directly facing the liquid crystal layer 11c by laminating on an upper layer side of the second transparent electrode film 22 and second interlayer insulation film 21.

Next, members connected to the liquid crystal panel 11 will be described. As shown in FIG. 1, in the control circuit board 13, on a substrate made of paper phenol or a glass epoxy resin, electronic components for supplying various kinds of input signals to the driver 12 are mounted, and wirings of not shown predetermined pattern (conductive path) are formed by wiring. To the control circuit board 13, one terminal of a flexible substrate 14 is connected.

As shown in FIG. 1, the flexible substrate 14 includes a base material made of a synthetic resin material (for example polyimide-based resin or the like) having an insulation property and flexibility, and has many lines of wiring patterns (not shown in the drawing) on the base material. The flexible substrate 14 is bent in a folded state in the liquid crystal display device 10, and one terminal in the length direction is connected to the control circuit board 13, and the other terminal is connected to the array substrate 11b of the liquid crystal panel 11, respectively. The flexible substrate 14 is FOG (Film On Glass)-mounted to the array substrate 11b of the liquid crystal panel 11. In both terminals in the length direction in the flexible substrate 14, a wiring pattern is exposed to the outside to forma terminal, and these terminals are electrically connected to the control circuit board 13 and the array substrate 11b, respectively. Among these, a flexible substrate side terminal (mounted component side terminal) 23 connected to the liquid crystal panel 11 will be described below. Thus, an input signal fed from the control circuit board 13 side may be transmitted to the liquid crystal panel 11 side.

As shown in FIG. 1, the driver 12 is formed of a LSI chip having a driving circuit inside thereof, operated based on a signal supplied from the control circuit board 13 that is a signal supply source to process an input signal supplied from the control circuit board 13 to generate an output signal, and outputs the output signal to the display area AA of the liquid crystal panel 11. The driver 12 has a laterally long square shape in a plan view (forms an elongated shape along a short side of the liquid crystal panel) and is COG (Chip-On-Glass)-mounted on the array substrate 11b of the liquid crystal panel 11.

Figure 5:
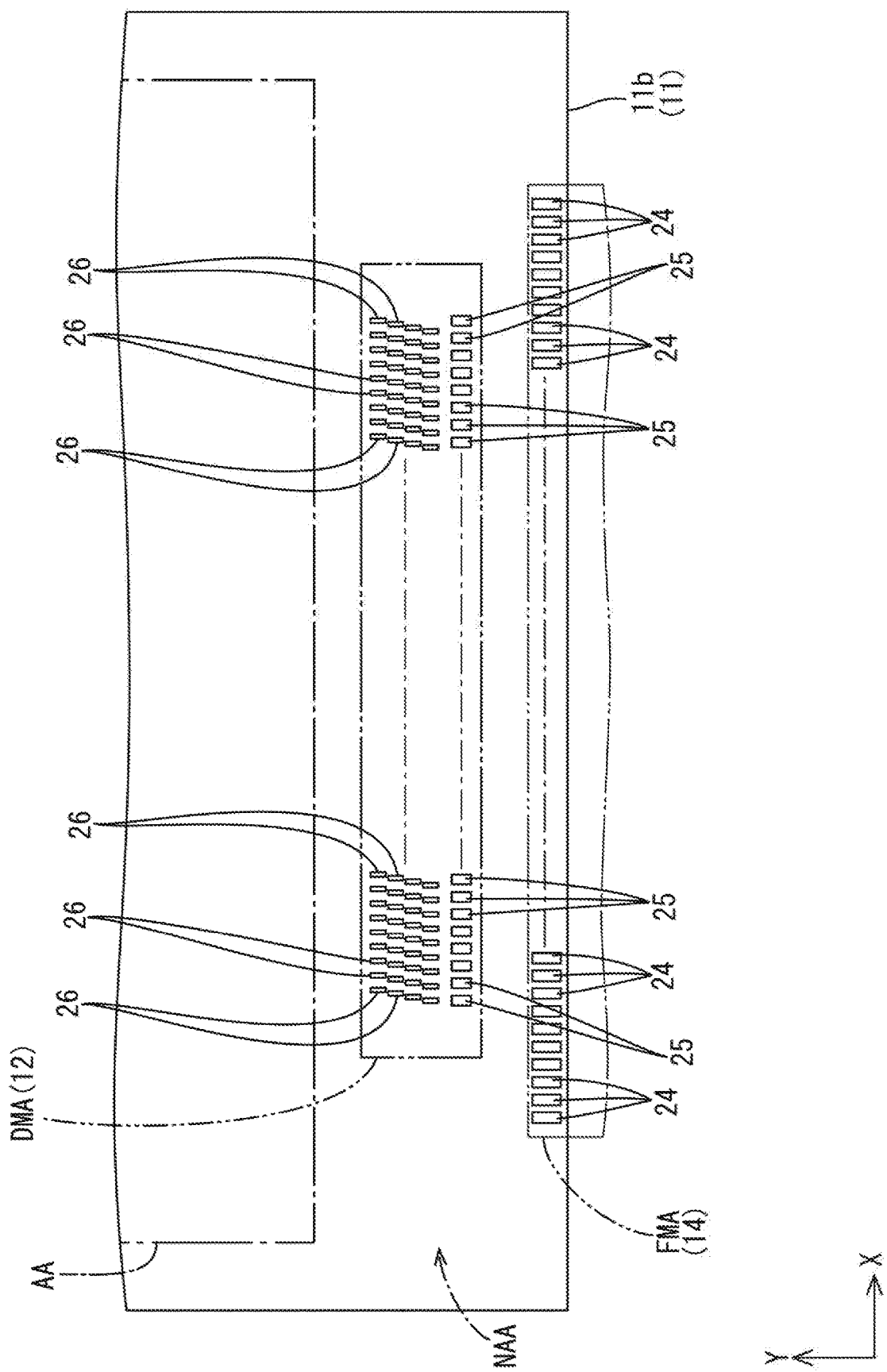
FIG. 5 is an enlarged plan view showing a mounting area of a driver and a flexible substrate in the array substrate.
Figure 6:
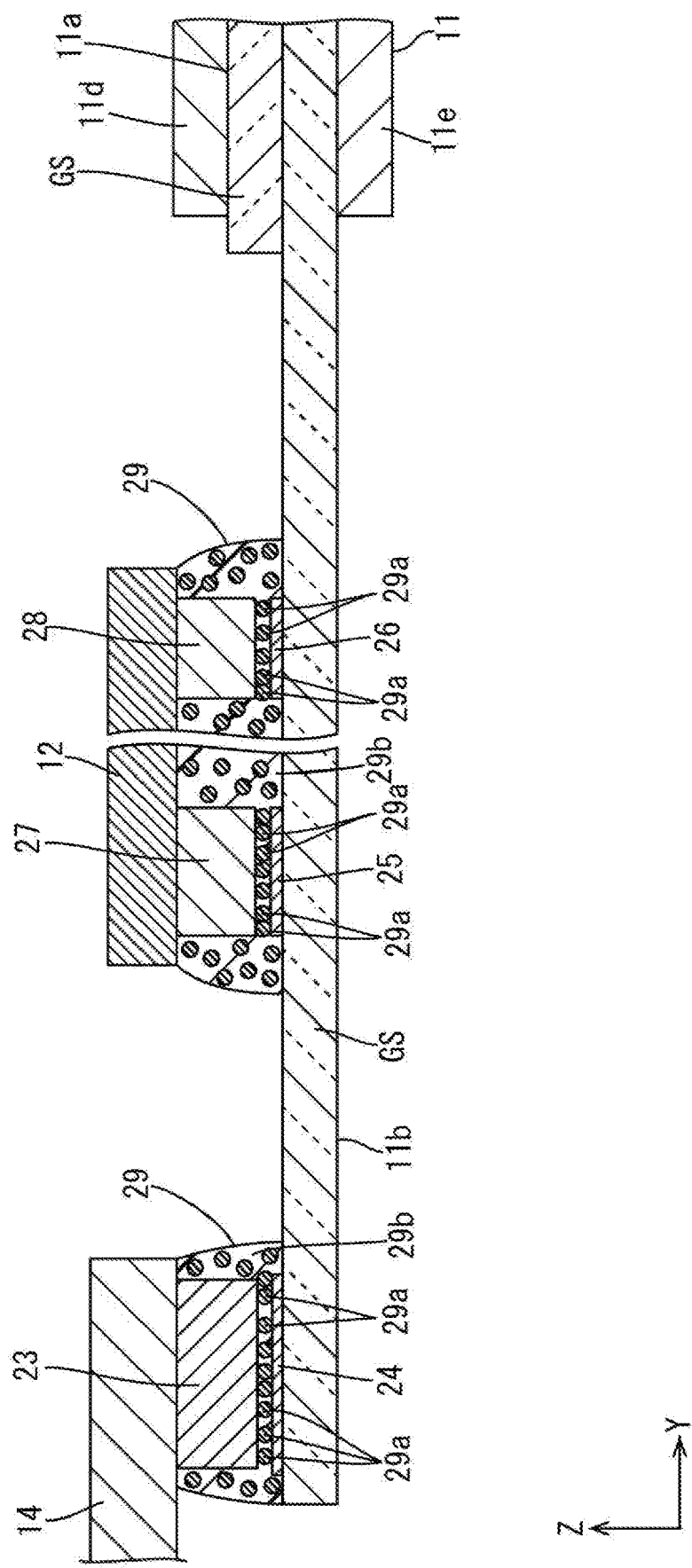
FIG. 6 is a schematic cross-sectional view showing a cross-sectional constitution related to a terminal connection structure of a liquid crystal panel, the driver and the flexible substrate.

Next, a terminal connection structure of the flexible substrate 14 and the driver 12 to a non-display area NAA of the array substrate 11b will be described. As shown in FIG. 1, in a non-overlapping part that does not overlap with the CF substrate 11a of the non-display area NAA of the array substrate 11b, a mounting area DMA of the driver 12 located relatively near to the display area AA and amounting area FMA of the flexible substrate 14 that sandwiches the mounting area DMA of the driver 12 with the display area AA are formed. As shown in FIG. 5, in the mounting area FMA of the flexible substrate 14 in the array substrate 11b, a plurality of panel side terminals 24 for flexible substrate (terminals, panel side terminals) for receiving input signal or power supply from the flexible substrate 14 side are provided in the form of aligning in plural in an X-axis direction with a clearance. On the other hand, in the mounting area DMA of the driver 12 in the array substrate 11b, a plurality of the panel side input terminals for inputting a signal to the driver 12 (terminal, input terminal) 25, and a plurality of the panel side output terminals for outputting a signal from the driver 12 (terminal, output terminal) 26 are provided in the form of arranging with a clearance along the X-axis direction, respectively. A panel side terminal 24 group for a flexible substrate, a panel side input terminal 25 group and a panel side output terminal 26 group are arranged in juxtaposition with a predetermined clearance along a Y-axis direction. A part of the panel side terminal 24 for flexible substrate and the panel side input terminal 25 are electrically connected by a connection wiring (not shown in the drawing) formed by wiring in the form of transecting between the mounting area FMA of the flexible substrate 14 and the mounting area DMA of the driver 12 among the non-display area NAA. Incidentally, in FIG. 5, the flexible substrate 14 and respective mounting areas DMA, FMA of the driver 12 are drawn with a two-dot chain line.

By contrast, as shown in FIG. 5, in one terminal in the flexible substrate 14, a plurality of the flexible substrate side terminals 23 electrically connected to the panel side terminal 24 for flexible substrate are arranged in juxtaposition along an X-axis direction with a clearance. In the driver 12, a plurality of the driver side input terminals (mounted component side input terminal) 27 electrically connected to the panel side input terminal 25 and a plurality of the driver side output terminals (mounted component side output terminal) 28 electrically connected to the panel side output terminal 26 are arranged in juxtaposition with a clearance in the X-axis direction. Between the array substrate 11b and the flexible substrate 14 of the liquid crystal panel 11 and the driver 12, an anisotropic conductive film (ACF) 29 is arranged in the form of intervening, respectively. The anisotropic conductive film 29 is formed of many conductive particles 29a and a binder 29b in which many conductive particles 29a are dispersed and blended, and the respective terminals 24 to 26 on the liquid crystal panel 11 side and the respective terminals 23, 27, 28 of the flexible substrate 14 and on the driver 12 side are electrically connected via the conductive particles 29a, respectively.

Subsequently, among the respective terminals 24 to 26 on the liquid crystal panel 11 side, the panel side output terminal 26 will be described in detail. As shown in FIG. 5, the panel side output terminals 26 are arranged to positions distanced with a clearance on the display area AA side relative to the panel side input terminal 25 in a Y-axis direction in the mounting area DMA of the driver 12 in the array substrate 11b. The panel side output terminals 26 have the installation numbers same as or larger than the respective installation numbers of the panel side terminals 24 and the panel side input terminals 25, specifically, for instance, equal to or larger than the installation number of the source lines 11j. That is, the panel side output terminals 26 tend to increase in the installation number together with the source lines 11j accompanying higher definition of the liquid crystal panel 11, as the higher definition progresses, the difference with the installation number of the panel side terminals 24 for flexible substrate and the panel side input terminals 25 tends to expand. When a specific arrangement is explained, the panel side output terminals 26, when ones arranged in an X-axis direction with a clearance are taken as one set, 4 sets in total are arranged along an oblique direction to the X-axis direction and the Y-axis direction. The panel side output terminals 26 adjacent in the oblique direction are arranged in the form of partially overlapping in the X-axis direction, thus, an arrangement space in the X-axis direction (arrangement clearance between adjacent panel side output terminals 26 in the X-axis direction) becomes smaller to result in an arrangement of high density.

Figure 7:
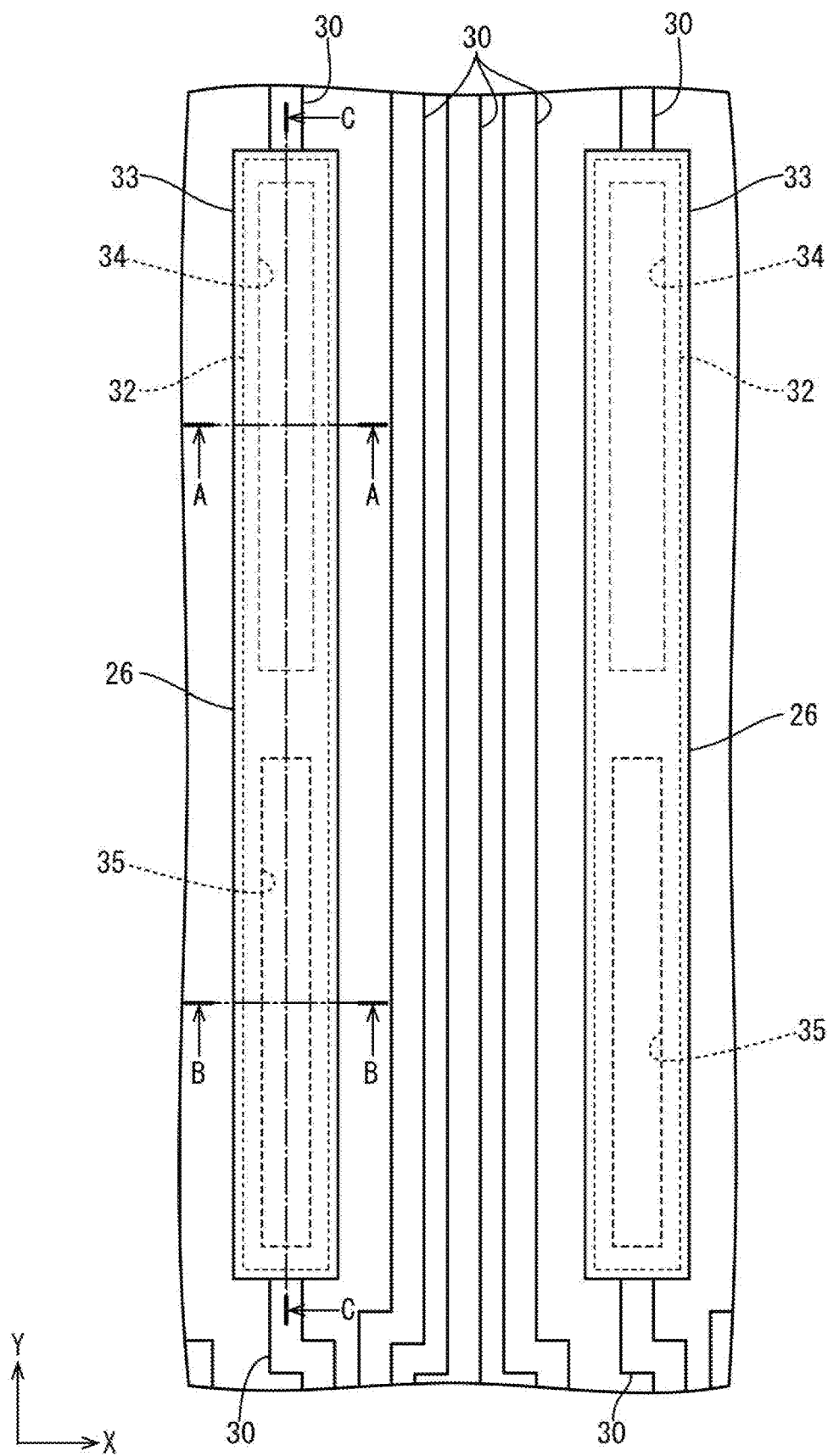
FIG. 7 is a plan view of a panel side output terminal.

As shown in FIG. 7, the panel side output terminal 26 is connected to the source line 11j via a lead-out wiring 30. A plurality of the lead-out wirings 30 are arranged in the form of individually connecting to each of the panel side output terminal 26 and each of the source line 11j. The plurality of the lead-out wirings 30 are lead-out in the form of expanding like a fan as a whole toward the display area AA (the upper side shown in FIG. 7) from the panel side output terminal 26 in the mounting area DMA of the driver 12. The lead-out wiring 30 related to the present embodiment is formed of a first metal film 15 different from a second metal film 18 of the source line 11j. Accordingly, in the lead-out wiring 30, a terminal lead-out on the display area AA side is arranged in the form of overlapping with a terminal in the source line 11j and these terminals are connected to the gate insulation film 16 via a not shown contact hole formed by opening in the gate insulation film 16. Furthermore, the lead-out wiring 30 is also lead-out on an opposite side (lower side shown in FIG. 7) to the display area AA side from the panel side output terminal 26 in the mounting area DMA of the driver 12, a terminal lead-out on the side opposite to the display area AA side may be connected to a not shown inspection terminal and a protective circuit for anti-static measure arranged to the non-display area NAA. Incidentally, three lead-out wirings 30 shown in the form of intervening between panel side output terminals 26 adjacent in the X-axis direction in FIG. 7 are a part lead-out from the panel side output terminal 26 to the side opposite to the display area AA side.

As shown in FIG. 7, the panel side output terminal 26 forms a vertically long square shape (elongated shape) in a plan view and has a short side dimension (width dimension) larger than a line width of the lead-out wiring 30. In the present embodiment, the panel side output terminal 26 is arranged such that a long side direction (elongated direction, length direction) and a short side direction (shortened direction, width direction) coincide with a Y-axis direction and an X-axis direction, respectively, and the lead-out wiring 30 is connected to a substantially center position of the short side direction. Accordingly, in the panel side output terminal 26, both terminal side parts of the short side direction protrude toward both sides of the X-axis direction of the lead-out wiring 30.

Figure 8:
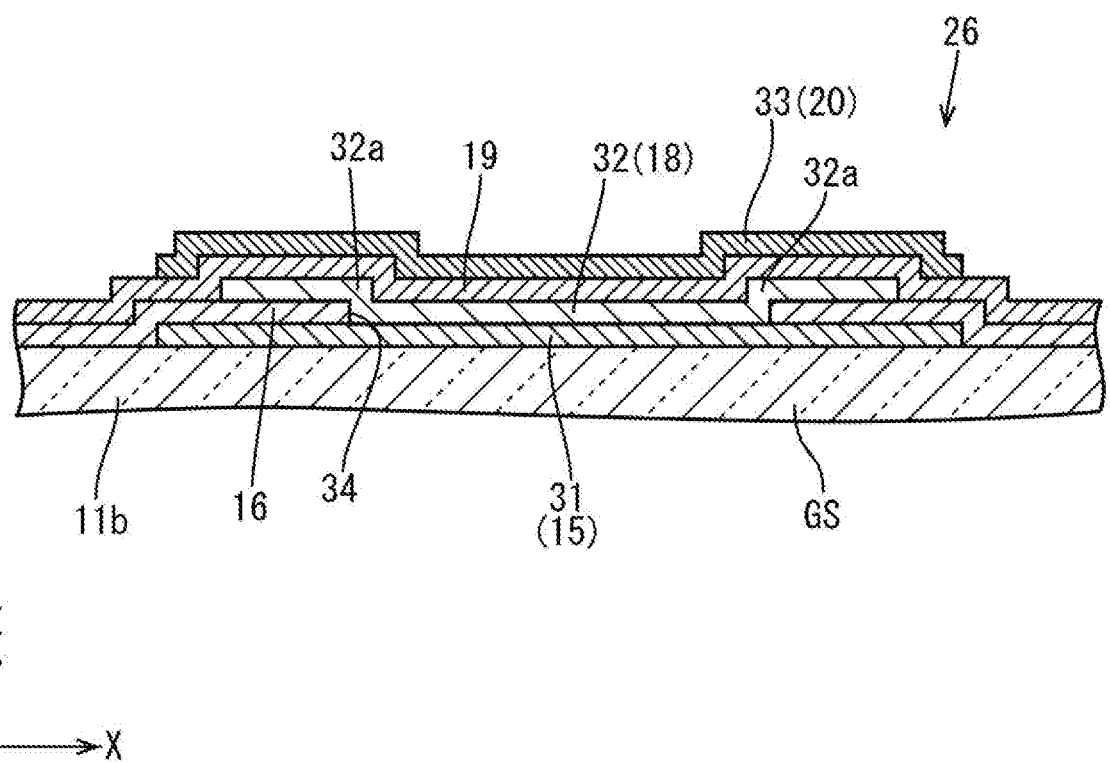
FIG. 8 is a cross-sectional view along an A-A line of FIG. 7.
Figure 9:
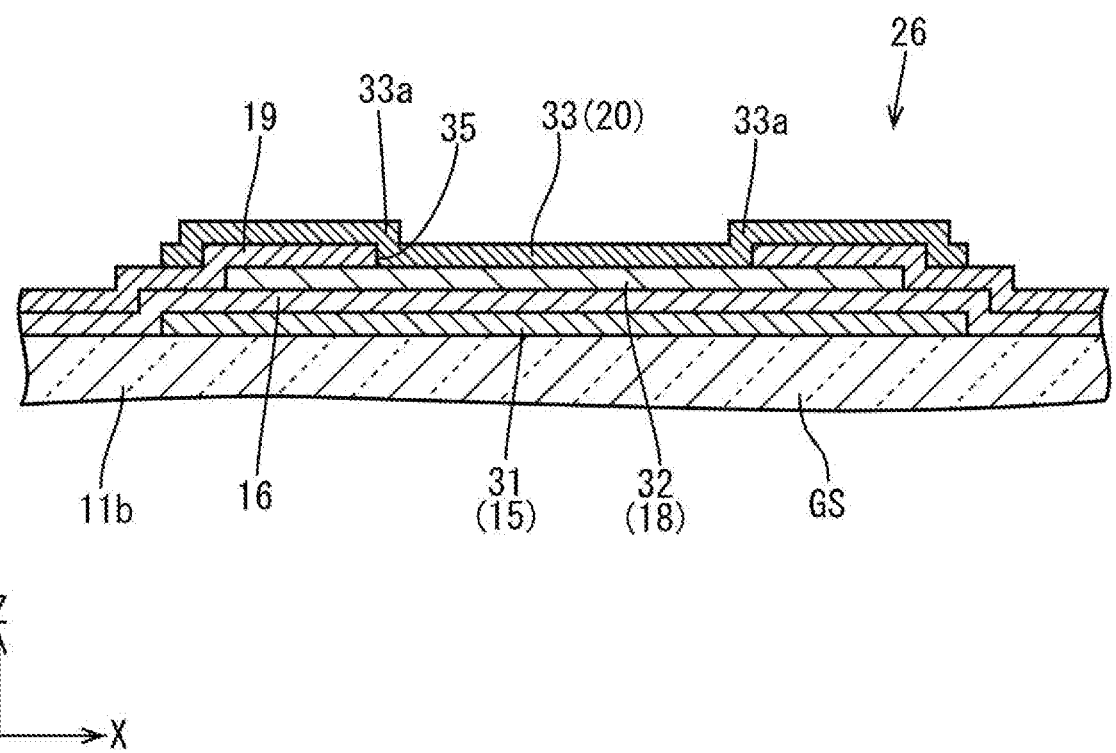
FIG. 9 is a cross-sectional view along a B-B line of FIG. 7.
Figure 10:
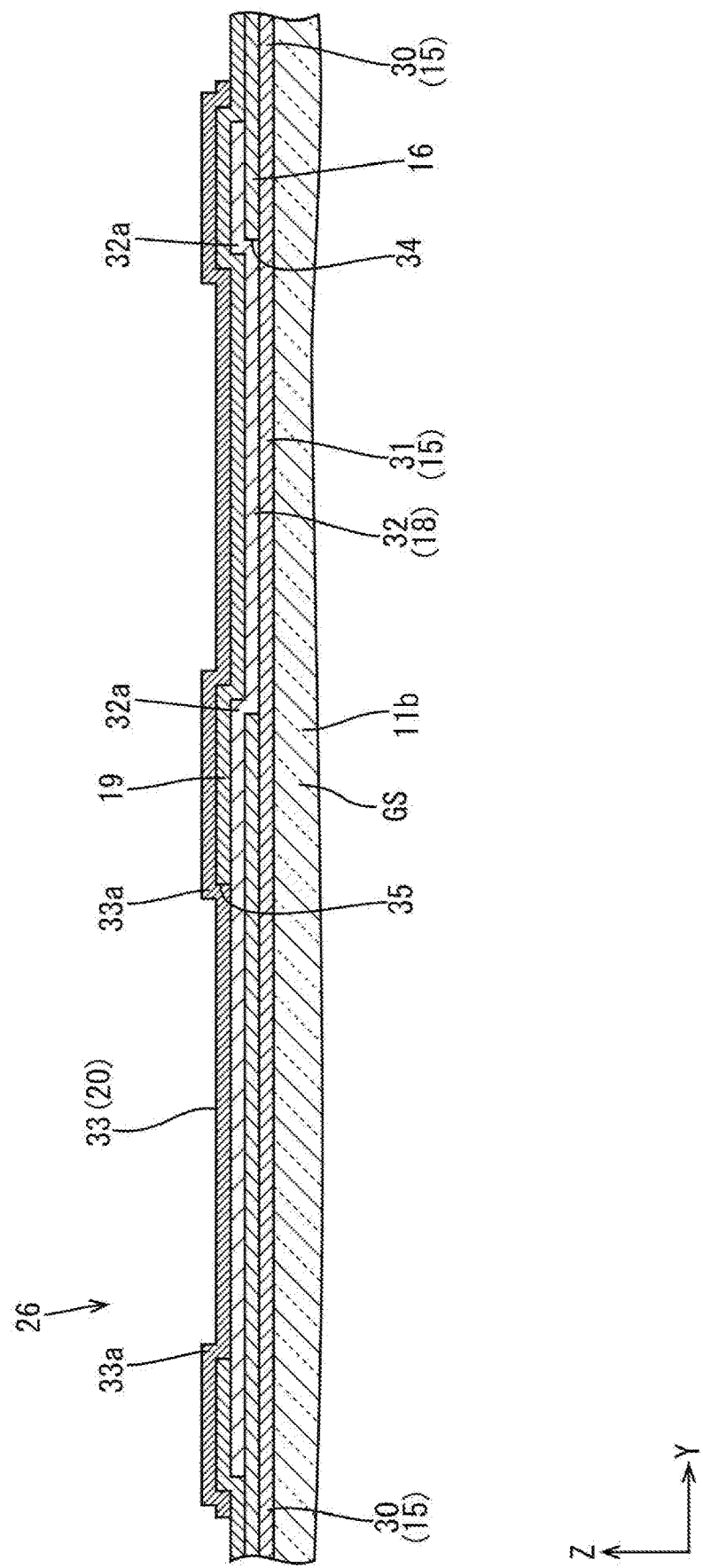
FIG. 10 is a cross-sectional view along a C-C line of FIG. 7.

As shown in from FIG. 8 to FIG. 10, the panel side output terminal 26 is constituted of a first terminal portion 31 made of the first metal film 15, a second terminal portion 32 made of the second metal film 18, and a third terminal portion 33 made of the first transparent electrode film 20. In the present embodiment, a reason why the panel side output terminal 26 is formed into a three-layer structure is that firstly since the first metal film 15 and the second metal film 18 are made of the same material, it is difficult to selectively remove only any one of these by etching when producing the array substrate 11b, other than this, when the second terminal portion is tentatively removed, by a portion of a film thickness of the second metal film 18, the third terminal portion 33 becomes a lower position, due to this, disconnection in the third terminal portion 33 may occur. By the way, in the array substrate 11b related to the present embodiment, at least in the mounted area DMA of the driver 12, over an entire area, the second interlayer insulation film 21 and the second transparent electrode film 22 are removed. A reason why the second transparent electrode film 22 may be partially removed in the array substrate 11b like this is because the second transparent film 22 is formed of a transparent electrode material different from the first transparent electrode film 20, and the reactivity of the first transparent electrode film 20 is low to an etching liquid used when the second transparent electrode film 22 is removed at the production of, for instance, the array substrate 11b.

As shown in FIG. 8 and FIG. 10, the first terminal portion 31 is made of the first metal film 15 and is directly connected to the lead-out wiring 30 made of the same first metal film 15. The second terminal portion 32 overlaps at least with the first terminal portion 31 in a plan view and is connected thereto via the first contact hole 34 formed by opening in the gate insulation film 16. The first contact hole 34 is arranged at a position overlapping with both the first terminal portion 31 and the second terminal portion 32 among the gate insulation film 16. The second terminal portion 32 is arranged in the form that its main part overlaps with the first contact hole 34 and in the form that an outer periphery edge part overlaps with an opening edge of the first contact hole 34. Therefore, an outer periphery edge part of the second terminal portion 32 is a step site 32a ridden on an opening edge of the first contact hole 34. Since the second terminal portion 32 is arranged in the form of overlapping with the first contact hole 34 and its opening edge like this, even when a position of the second terminal portion 32 fluctuates a little to the first contact hole 34 due to production reason (for instance, exposure accuracy of photomask or etching accuracy), the second terminal portion 32 may be inserted over an entire area of the first contact hole 34, thus a contact area between the first terminal portion 31 and the second terminal portion 32 may be maintained constant.

As shown in FIG. 9 and FIG. 10, the third terminal portion 33 overlaps with at least the second terminal portion 32 in a plan view and is connected thereto via the second contact hole 35 formed by opening in the first interlayer insulation film 19. The second contact hole 35 is arranged at a position overlapping with both the second terminal portion 32 and third terminal portion 33 among the first interlayer insulation film 19. The third terminal portion 33 is arranged in the form where its main part overlaps with the second contact hole 33, and an outer periphery edge part overlaps with the opening edge of the second contact hole 35. Accordingly, the outer periphery edge part of the second terminal portion 33 is step site 33a ridden on an opening edge of the second contact hole. In the same manner as the second terminal portion 32, since the third terminal portion 33 is arranged in the form of overlapping with the second contact hole 35 and its opening edge, even when a position of the third terminal portion 33 fluctuates a little relative to the second contact hole 35 due to reasons of production, the third terminal portion 33 can be inserted over the entire area of the second contact hole 35, thus, a connection area between the second terminal portion 32 and the third terminal portion 33 may be maintained constant.

Then, as shown in FIG. 7 and FIG. 10, the gate insulation film 16 and the first interlayer insulation film 19 related to the present embodiment are formed such that the first contact hole 34 and the second contact hole 35 do not overlap each other. Specifically, the first contact hole 34 and the second contact hole 35 are arranged in juxtaposition with a clearance therebetween along a Y-axis direction that is a long side direction of the panel side output terminal 26. Each of the contact holes 34, 35 has, in the same manner as an outer shape of the panel side output terminal 26, a vertically long square shape in a plan view, and its long side dimension is formed to be smaller than at least a half a long side dimension of the panel side output terminal 26.

As was described above, the second terminal portion 32 and third terminal portion 33 have step sites 32a, 33a because, as shown in from FIG. 8 to FIG. 10, the respective outer periphery edge parts are arranged to overlap with the respective opening edges of the first contact hole 34 and the second contact hole 35, and, when while taking the constitution like this, the second contact hole 35 is arranged at a position that does not overlap with the first contact hole 34, an overlapping amount of the second terminal portion 32 to the opening edge of the first contact hole 34 in the gate insulation film 16 may be set irrespective of the opening edge of the second contact hole 35 in the first interlayer insulation film 19. That is, in the case where the second contact hole is tentatively arranged at a position overlapping with the first contact hole, it is necessary to take care such that the opening edge of the second contact hole in the first interlayer insulation film 19 does not overlap with the step site 32a generated when the second terminal portion 32 inserted into the first contact hole rides on the opening edge of the first contact hole in the gate insulation film 16, specifically, it is necessary to secure abundant an overlapping amount of the second terminal portion 32 to the opening edge of the first contact hole in the gate insulation film 16. The design like this is performed because if the opening edge of the second contact hole overlaps with the step site 32a of the second terminal portion 32, the overlapped part becomes a large step resulted from adding film thicknesses of the second metal film 18 and the first interlayer insulation film 19, and thereby the disconnection may be caused in the third terminal portion 33 laminated on an upper layer side thereof. Compared therewith, when the second contact hole 35 is arranged at a position that does not overlap with the first contact hole 34, there is no necessary of taking care in the arrangement of the opening edge of the second contact hole 35 to the step site 32a of the second terminal portion 32, thus, the overlapping amount of the second terminal portion 32 to the opening edge of the first contact hole 34 in the gate insulation film 16 may be reduced. Thus, a formation area of the panel side output terminal 26 becomes small to be preferable from the viewpoint of obtaining high definition. Furthermore, a formation area of the panel side output terminal 26 in a direction orthogonal to an arrangement direction with the first contact hole 34 and the second contact hole 35, that is, a short side direction orthogonal to a long side direction in the panel side output terminal 26 may be made smaller. Accordingly, as was described above, in a constitution where a plurality of the panel side output terminals 26 are arranged along the short side direction, an arrangement clearance between the panel side output terminals 26 may be made smaller, and high definition may be preferably obtained, thereby.

As shown in from FIG. 7 to FIG. 10, each of the terminal portions 31, 32, and 33 constituting the panel side output terminal 26 has a contour roughly coinciding with a contour of the panel side output terminal 26 and main parts (center side part excluding outer periphery edge part) are laminated in the form of overlapping with each other in a plan view. Accordingly, as shown in FIG. 10, the first terminal portion 31 overlaps in a plan view also with the second contact hole 35 in addition to the first contact hole 34. Among the first terminal portion 31, as shown in FIG. 9 and FIG. 10, a part overlapping with the second contact hole 35 is insulated from the second terminal portion 32 by the gate insulation film 16. Here, when the first terminal portion is provided in the form of tentatively overlapping with the first contact hole 34 but not overlapping with the second contact hole 35, a part overlapping with the second contact hole 35 among the second terminal portion 32 and the third terminal portion 33 becomes lower by a film thickness part of the first metal film 15. Due to this thickness decrease, a step site other than the above-described step sites 32a, 33a may be formed on the second terminal portion 32 and the third terminal portion 33. With respect to the point, when the first terminal portion 31 is disposed to overlap the second contact hole 35 as was described above, the flatness of the second terminal portion 32 and the third terminal portion 33 may be secured.

Similarly, as shown in FIG. 10, the third terminal portion 33 overlaps with, in addition to the second contact hole 35, also with the first contact hole 34 in a plan view. Among the third terminal portion 33, as shown in FIG. 8 and FIG. 10, a part overlapping with the first contact hole 34 is insulated from the second terminal portion 32 by the first interlayer insulation film 19. Here, if compared with the case where the third terminal portion is formed in the form of overlapping with the second contact hole 35 but not overlapping with the first contact hole 34, a formation area of the third terminal portion 33 may be secured wide. Accordingly, in a constitution where the driver side output terminal 28 of the driver 12 is connected to the third terminal portion 33, since a contact area of the panel side output terminal 26 to the driver side output terminal 28 of the driver 12 may be sufficiently secured, the electric resistance between the driver side output terminal 28 of the driver 12 and the panel side output terminal 26 may be reduced.

As was described above, the array substrate (mounted substrate) 11b of the present embodiment includes at least: a glass substrate GS on which a driver (mounted component) 12 is mounted; a panel side output terminal (terminal) 26 that is a terminal arranged on a mounting area DMA on which the driver 12 is mounted of the glass substrate GS and connected to the driver 12; a first terminal portion 31 that is made of a first metal film (first conductive film) 15 disposed on the glass substrate GS and constitutes a panel side output terminal 26; a gate insulation film (first insulation film) 16 that is arranged on an upper layer side of the first metal film 15, the gate insulation film 16 being formed by opening a first contact hole 34 at a position overlapping with a first terminal portion 31; a second terminal portion 32 that is made of a second metal film (second conductive film) 18 arranged on an upper layer side of the gate insulation film 16 and constitutes a panel side output terminal 26, the second terminal portion 32 being arranged in the form of overlapping with at least the first contact hole 34 and its opening edge and being connected to the first terminal portion 31 via the first contact hole 34; a first interlayer insulation film (second insulation film) 19 arranged on an upper layer side of the second metal film 18, the first interlayer insulation film 19 being formed by opening the second contact hole 35 at apposition that overlaps with the second terminal portion 32 and does not overlap with the first contact hole 34; and a third terminal portion 33 that is made of a first transparent electrode film (third conductive film) 20 arranged on the upper layer side of the first interlayer insulation film 19 and constitutes a panel side output terminal 26, the third terminal portion 33 being arranged in the form of overlapping with at least the second contact hole 35 and its opening edge and being connected to the second terminal portion 32 via the second contact hole 35.

According to a constitution like this, the driver 12 is, when mounted on the mounting area DMA in the glass substrate GS, connected to the panel side output terminal 26 arranged on the mounting area DMA. The panel side output terminal 26 has a constitution such that the second terminal portion 32 made of the second metal film 18 is connected via the first contact hole 34 formed by opening in the gate insulation film 16 to the first terminal portion 31 made of the first metal film 15, and the third terminal portion 33 made of the first transparent electrode film 20 is connected via the second contact hole 35 formed by opening in the first interlayer insulation film 19 to the second terminal portion 32.

Since the second terminal portion 32 is arranged in the form of overlapping with at least the first contact hole 34 and its opening edge, even when a position of the second terminal portion 32 fluctuates a little to the first contact hole 34 due to production reason, the second terminal portion 32 may be inserted over an entire area of the first contact hole 34, thus a contact area between the first terminal portion 31 and the second terminal portion 32 may be constant. In the same manner, since the third terminal portion 33 is arranged in the form of overlapping with at least the second contact hole 35 and its opening edge, a contact area between the second terminal portion 32 and the third terminal portion 33 becomes constant.

While taking the constitution like this, by arranging the second contact hole 35 to a position that does not overlap with the first contact hole 34, an overlapping amount of the second terminal portion 32 to an opening edge of the first contact hole 34 in the gate insulation film 16 may be set irrespective of the opening edge of the second contact hole 35 in the first interlayer insulation film 19. That is, in the case where the second contact hole is tentatively arranged at a position overlapping with the first contact hole 34, it is necessary to take care such that the opening edge of the second contact hole in the first interlayer insulation film 19 does not overlap to the step site 32a generated when the second terminal portion 32 inserted into the first contact hole 34 rides on the opening edge of the first contact hole 34 in the gate insulation film 16, specifically, it is necessary to secure the overlapping amount of the second terminal portion 32 to the opening edge of the first contact hole 34 in the gate insulation film 16 abundant. By contrast, when the second contact hole 35 is arranged at a position that does not overlap with the first contact hole 34, an overlapping amount of the second terminal portion 32 to the opening edge of the first contact hole 34 in the gate insulation film 16 may be made small. Thus, a formation area of the panel side output terminal 26 becomes smaller.

Furthermore, the panel side output terminal 26 has an elongated shape, and the gate insulation film 16 and the first interlayer insulation film 19 are formed such that the first contact hole 34 and the second contact hole 35 are aligned along the longitudinal direction of the panel side output terminal 26. In this manner, in a direction orthogonal to an arrangement direction of the first contact hole 34 and the second contact hole 35, that is, in a short length direction orthogonal to a longitudinal direction in the panel side output terminal 26, a formation area of the panel side output terminal 26 may be made smaller. Accordingly, when an arrangement where for example a plurality of the panel side output terminals 26 are arranged along the short side direction is adopted, an arrangement clearance between the panel side output terminals 26 may be made smaller.

Furthermore, the first terminal portion 31 is disposed to overlap the second contact hole 35. If the first terminal portion 31 is disposed not to overlap the second contact hole 35, a part overlapping with the second contact hole 35 of the second terminal portion 32 and the third terminal portion 33 becomes lower by an amount of a film thickness of the first metal film. Due to this decrease, there is a care that step sites may be formed abundant in the second terminal portion 32 and the third terminal portion 33. With respect to the point, by providing the first terminal portion 31 in the form of overlapping with the second contact hole 35 as was described above, the flatness of the second terminal portion 32 and the third terminal portion 33 may be secured.

Furthermore, the third terminal portion 33 is disposed to overlap the first contact hole 34. In this manner, compared with the case where the third terminal portion 33 is tentatively arranged in the form of not overlapping with the first contact hole 34, a formation area of the third terminal portion 33 may be secured wide. Accordingly, for example, when a constitution where the driver 12 is connected to the third terminal portion 33 is adopted, since a contact area of the panel side output terminal 26 to the driver 12 is sufficiently secured, the electric resistance between the driver 12 and the panel side output terminal 26 may be reduced.

Furthermore, the terminal includes the panel side input terminal (input terminal) 25 for inputting a signal to the driver 12 and the panel side output terminal (output terminal) 26 for outputting a signal from the driver 12, and, at least the panel side output terminal 26 is constituted of at least the first terminal portion 31, the second terminal portion 32 and the third terminal portion 33. Compared with the panel side input terminal, the panel side output terminal 26 from which a signal from the driver 12 is outputted tends to be demanded to have more installation number as the number of signals to be outputted increases. Thus, when the panel side output terminal 26 is constituted at least from the first terminal portion 31, the second terminal portion 32 and the third terminal portion 33, a formation area of the panel side output terminal 26 may be made smaller to be preferable from the viewpoint of increasing the installation number related to the panel side output terminal 26.

Furthermore, the liquid crystal panel (display panel) 11 related to the present embodiment includes an array substrate 11b, and a CF substrate (counter substrate) 11a arranged in the form of facing with the array substrate 11b. According to the liquid crystal panel 11 of the constitution like this, a formation area of the panel side output terminal 26 is made smaller to be preferable from the viewpoint of attaining high definition of an image to be displayed.

Second Embodiment

A second embodiment of the present invention will be described with reference to from FIG. 11 to FIG. 15. In this second embodiment, one in which a structure of a panel side output terminal 126 is changed will be shown. By the way, regarding the same structure, action and effect as first embodiment described above, duplicated description will be omitted.

Figure 11:
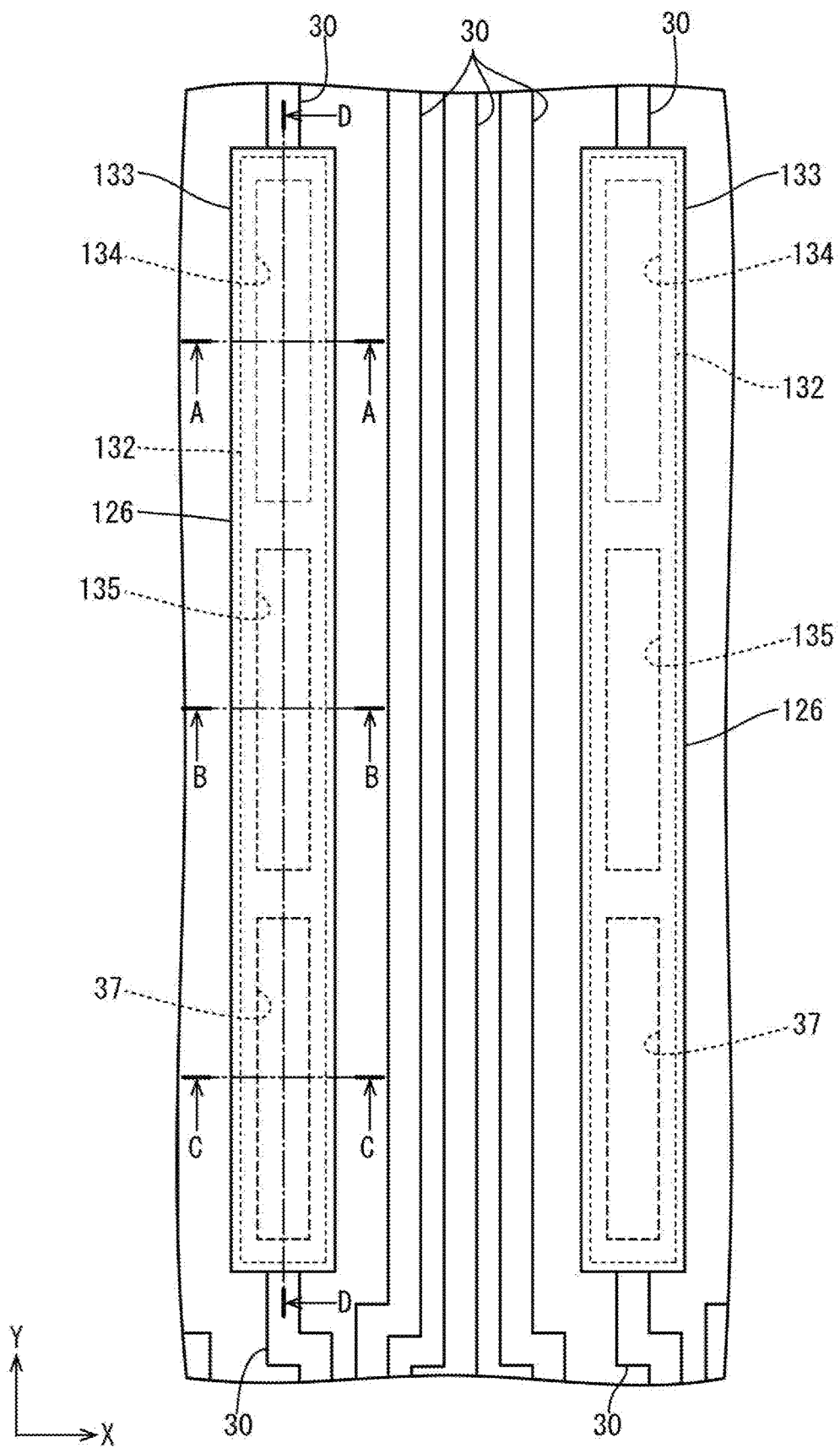
FIG. 11 is a plan view of a panel side output terminal related to second Embodiment of the present invention.
Figure 12:
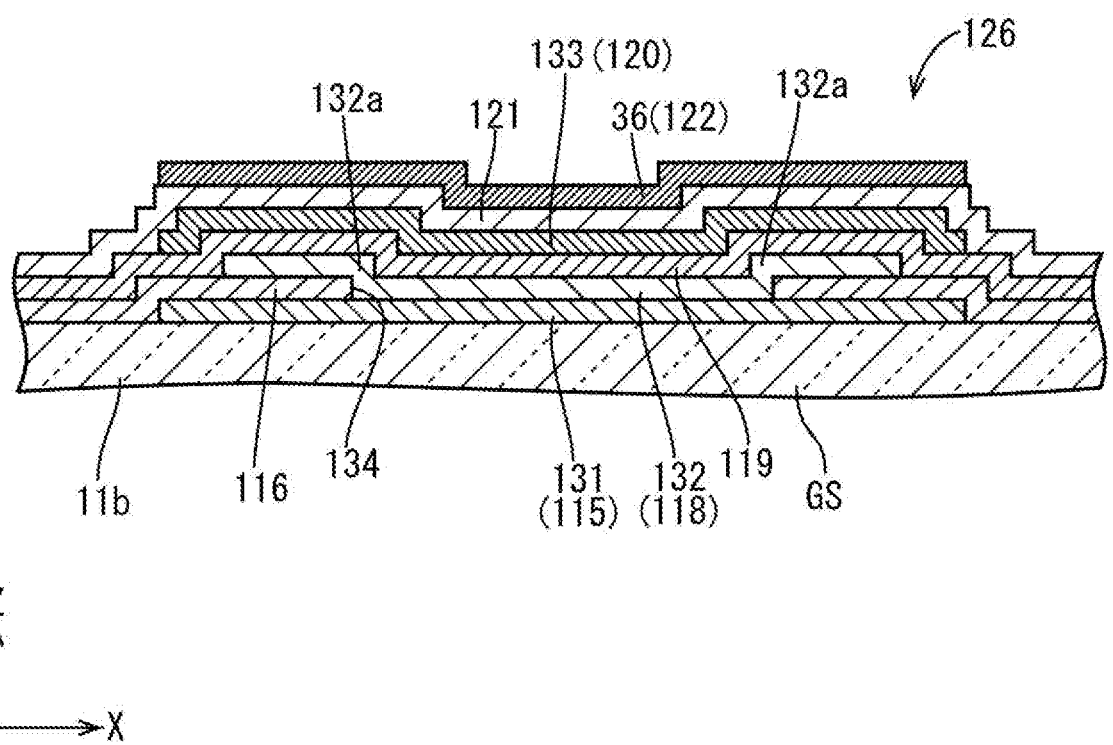
FIG. 12 is a cross-sectional view along an A-A line of FIG. 11.
Figure 13:
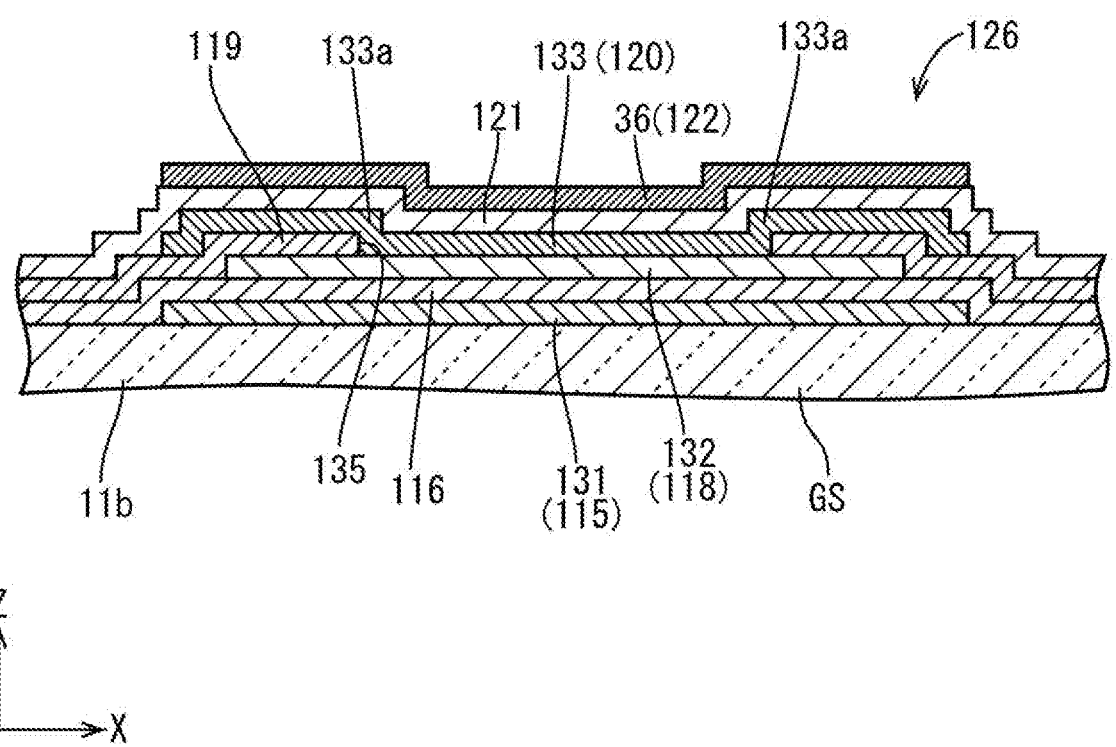
FIG. 13 is a cross-sectional view along a B-B line of FIG. 11.
Figure 15:
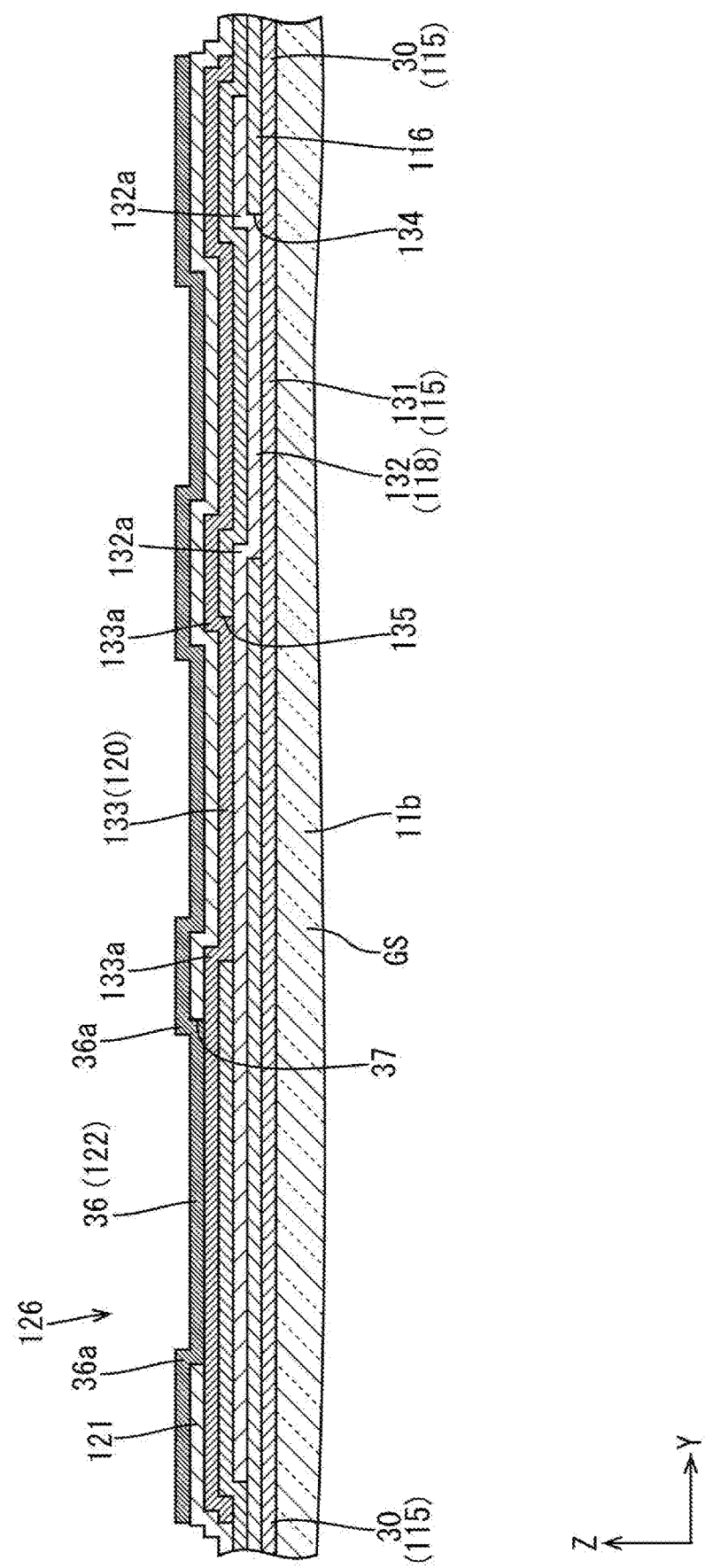
FIG. 15 is a cross-sectional view along a D-D line of FIG. 11.
Figure 16:
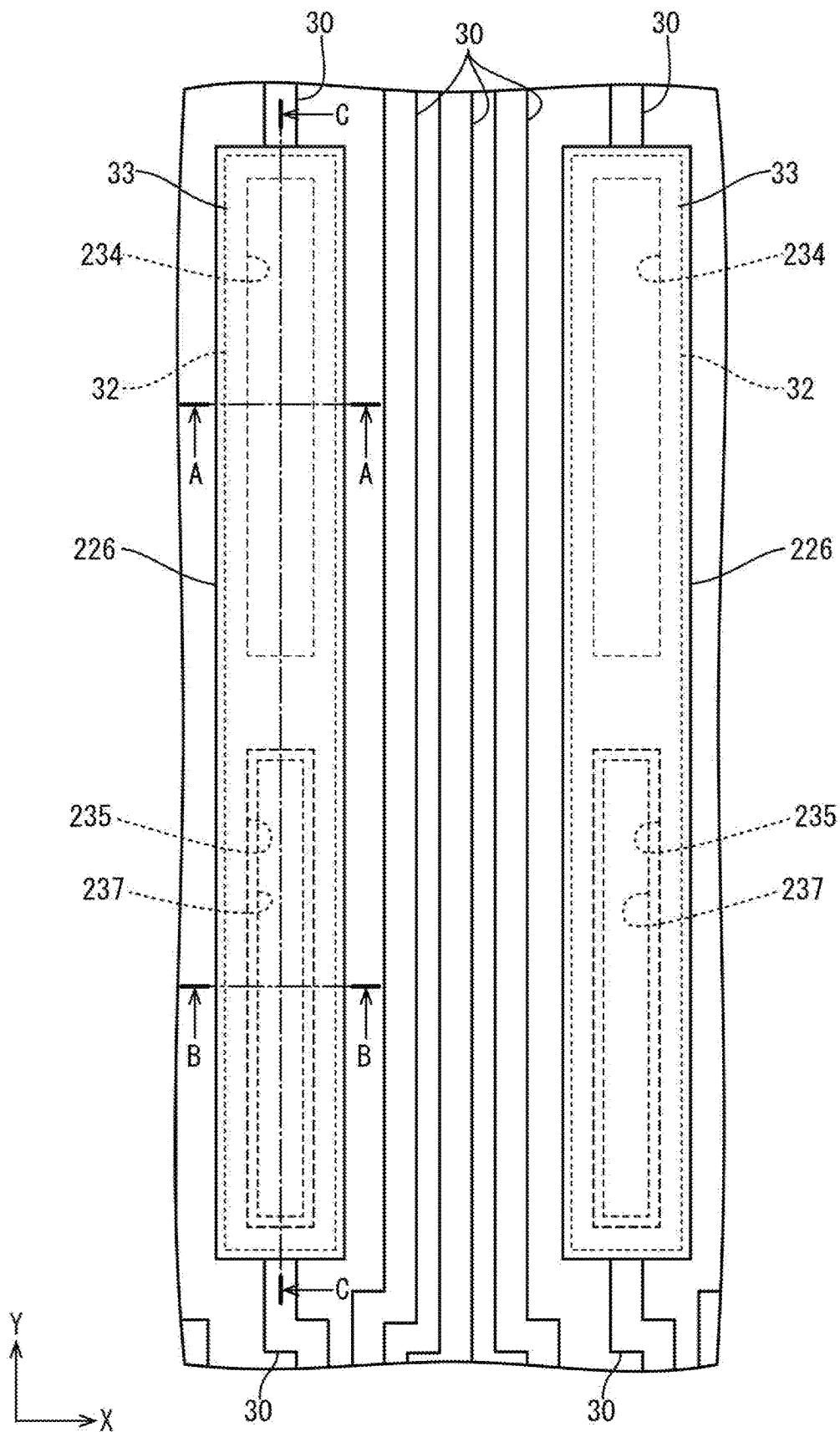
FIG. 16 is a plan view of a panel side output terminal related to third Embodiment of the present invention.
Figure 17:
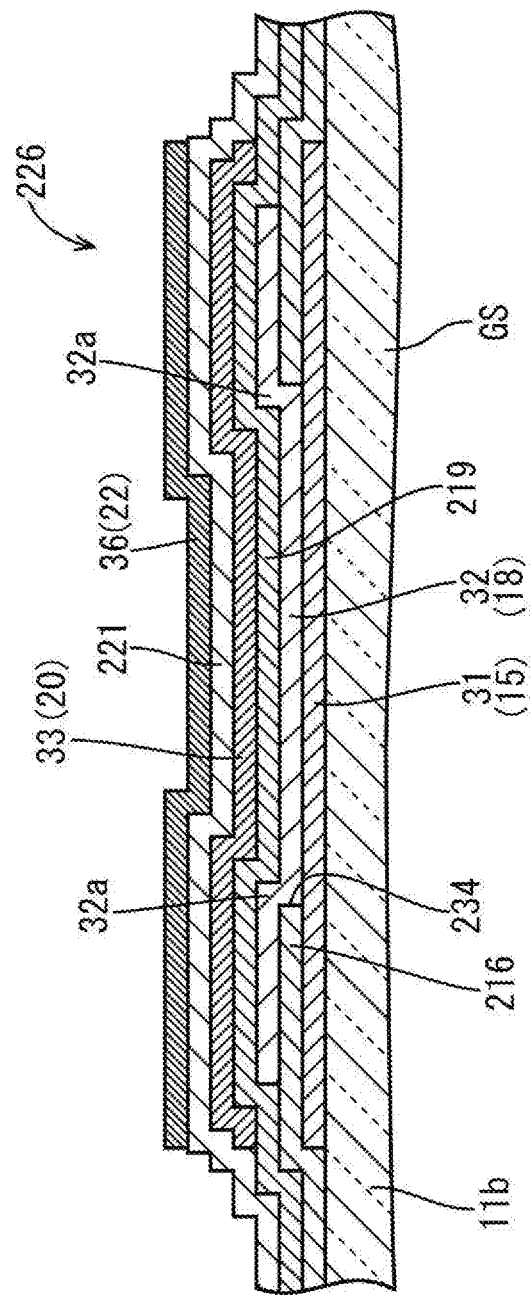
FIG. 17 is a cross-sectional view along an A-A line of FIG. 16.
Figure 18:
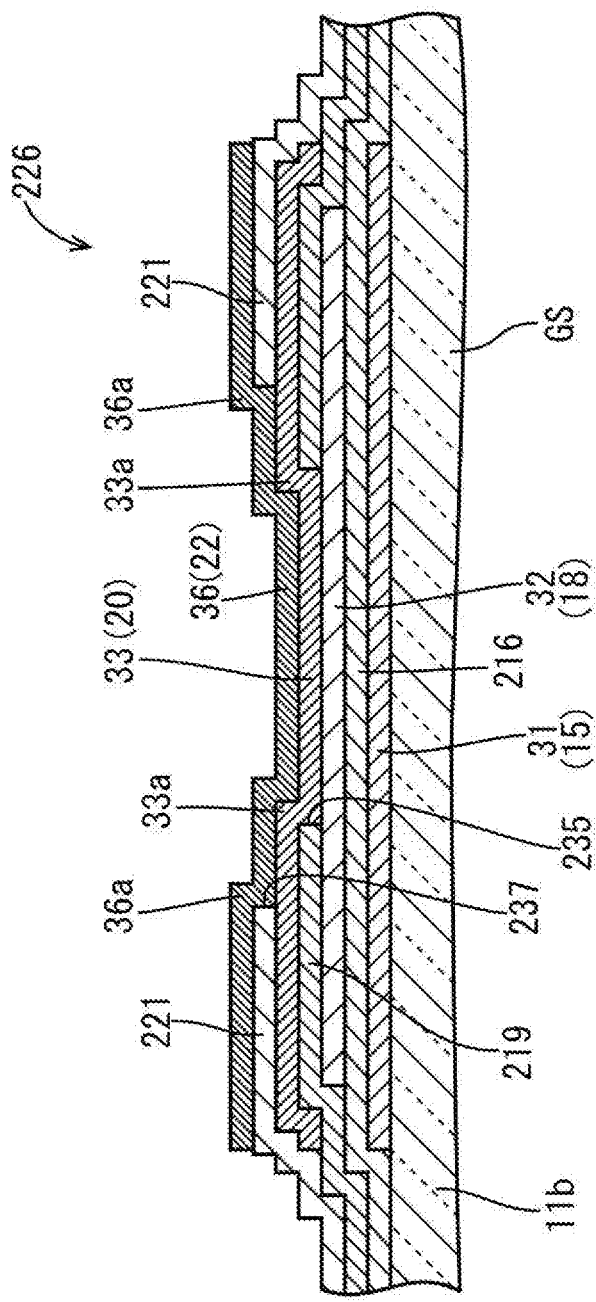
FIG. 18 is a cross-sectional view along a B-B line of FIG. 16.
Figure 19:
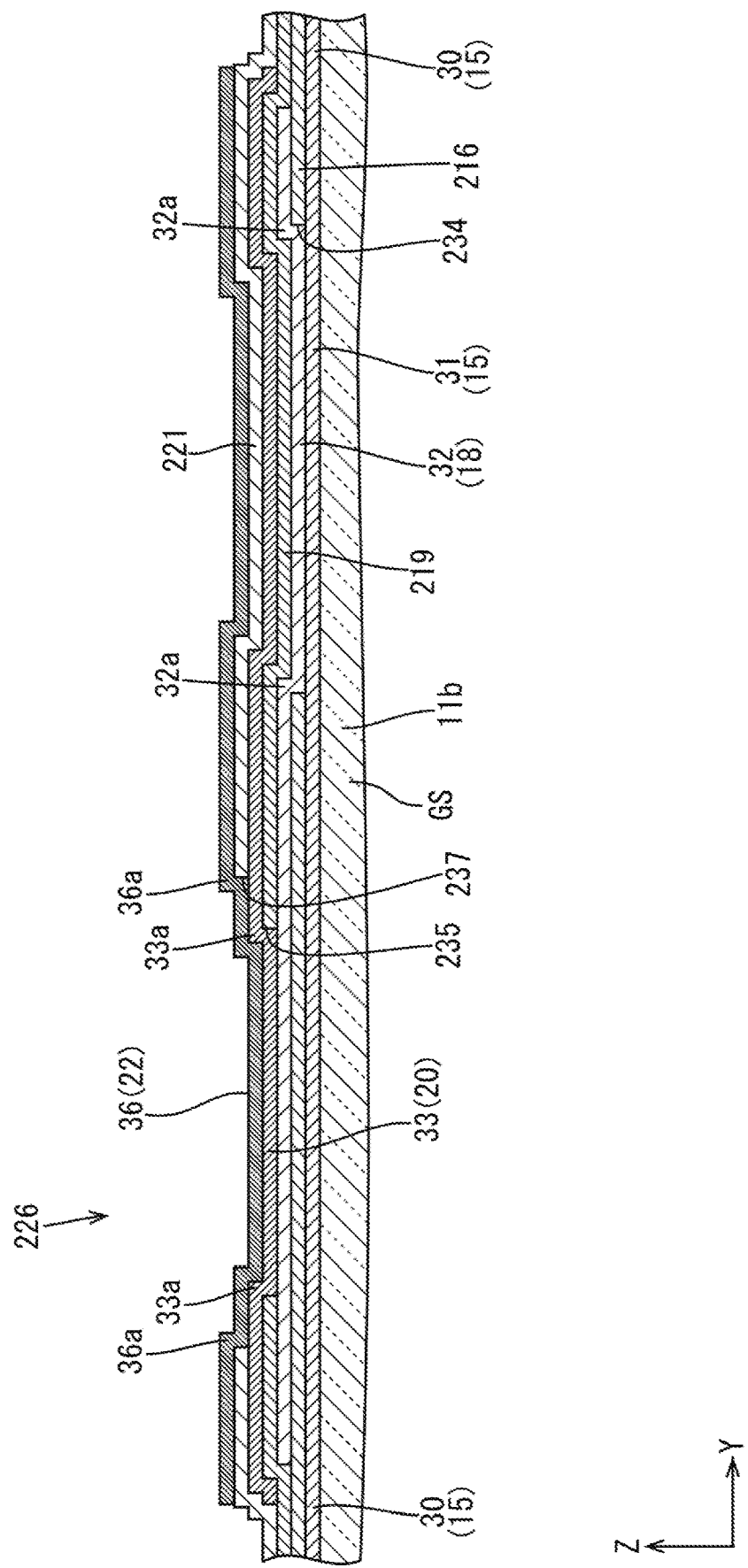
FIG. 19 is a cross-sectional view along a C-C line of FIG. 16.
Figure 20:
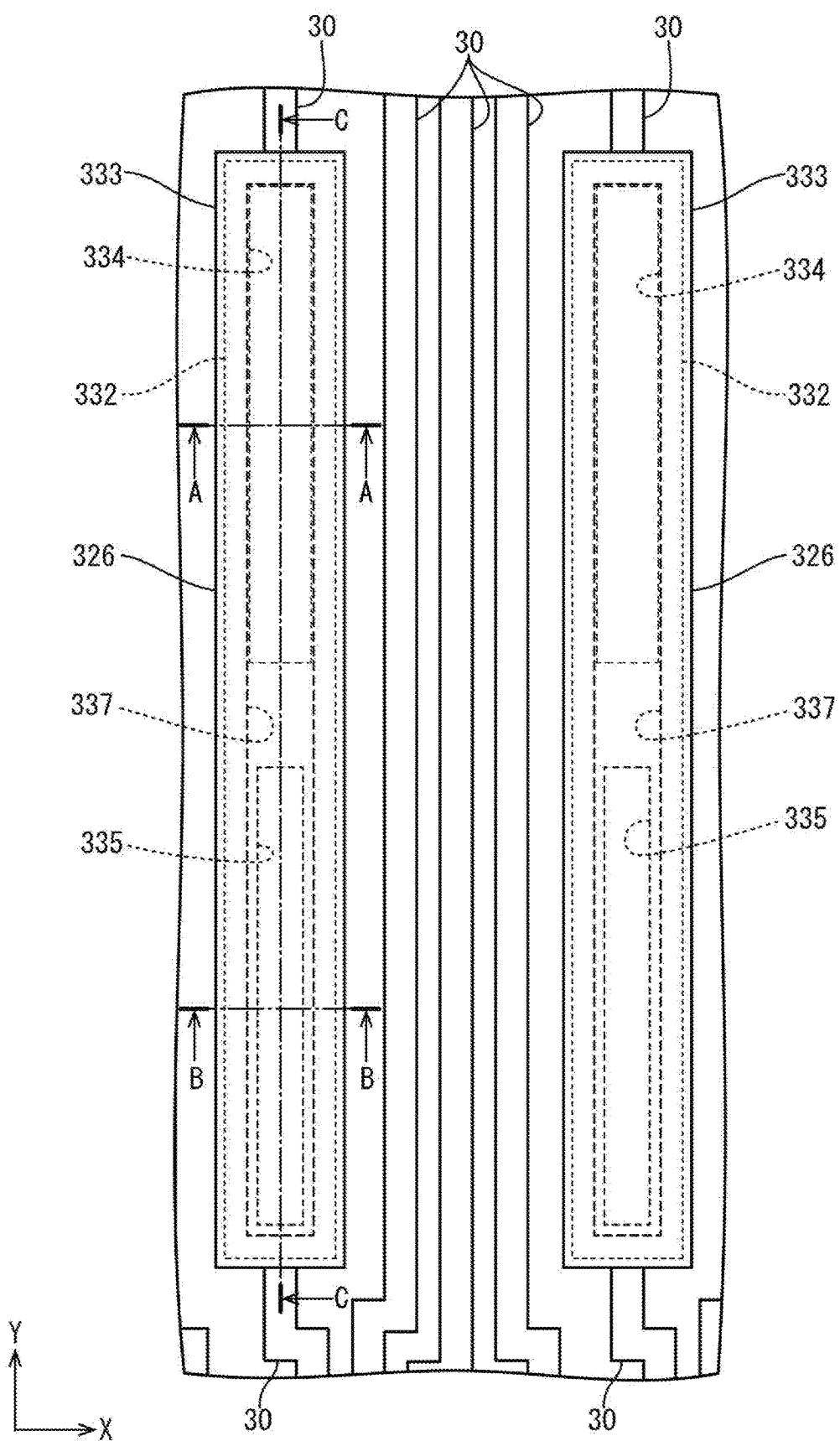
FIG. 20 is a plan view of a panel side output terminal related to fourth Embodiment of the present invention.
Figure 21:
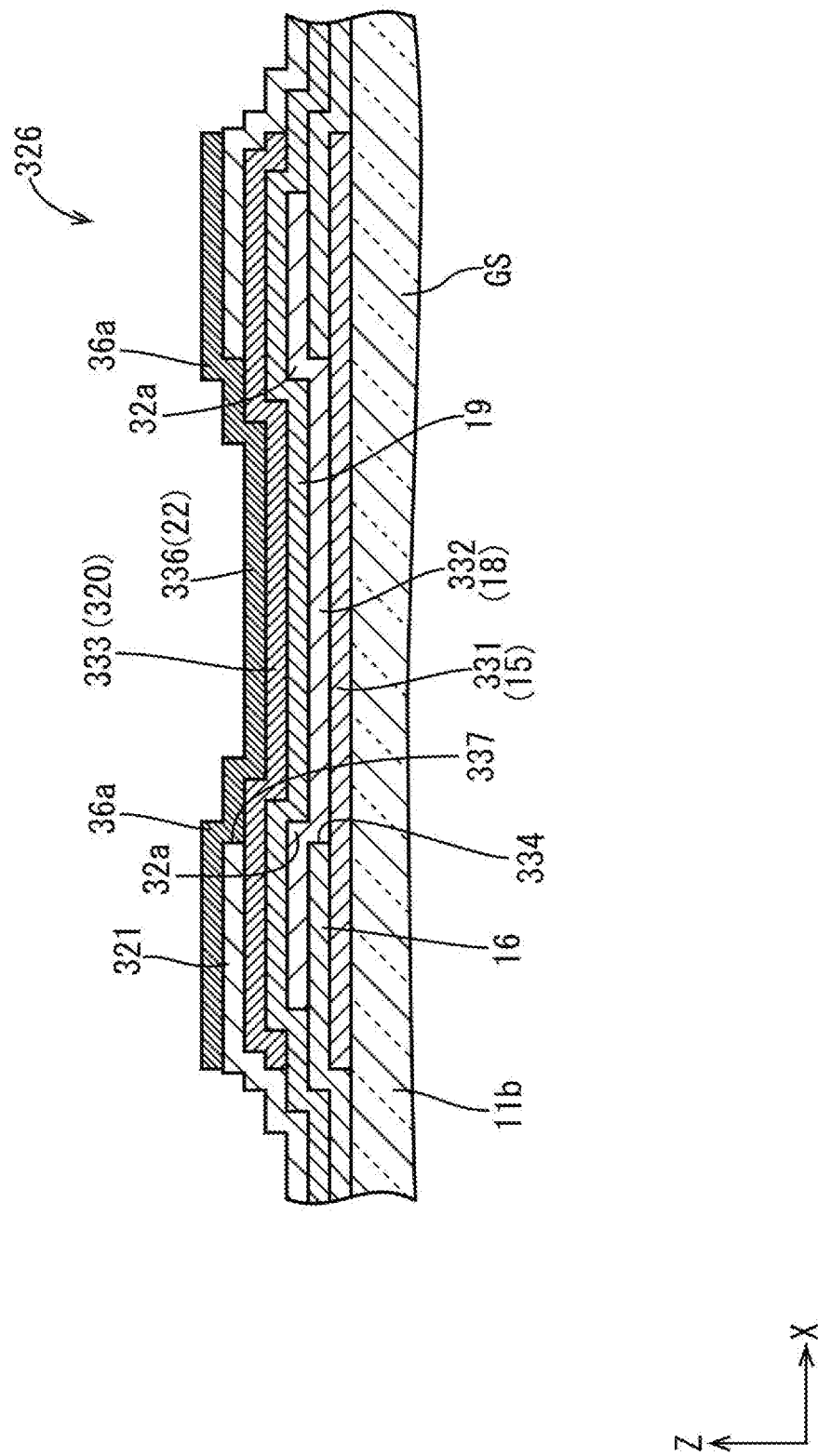
FIG. 21 is a cross-sectional view along an A-A line of FIG. 20.
Figure 22:
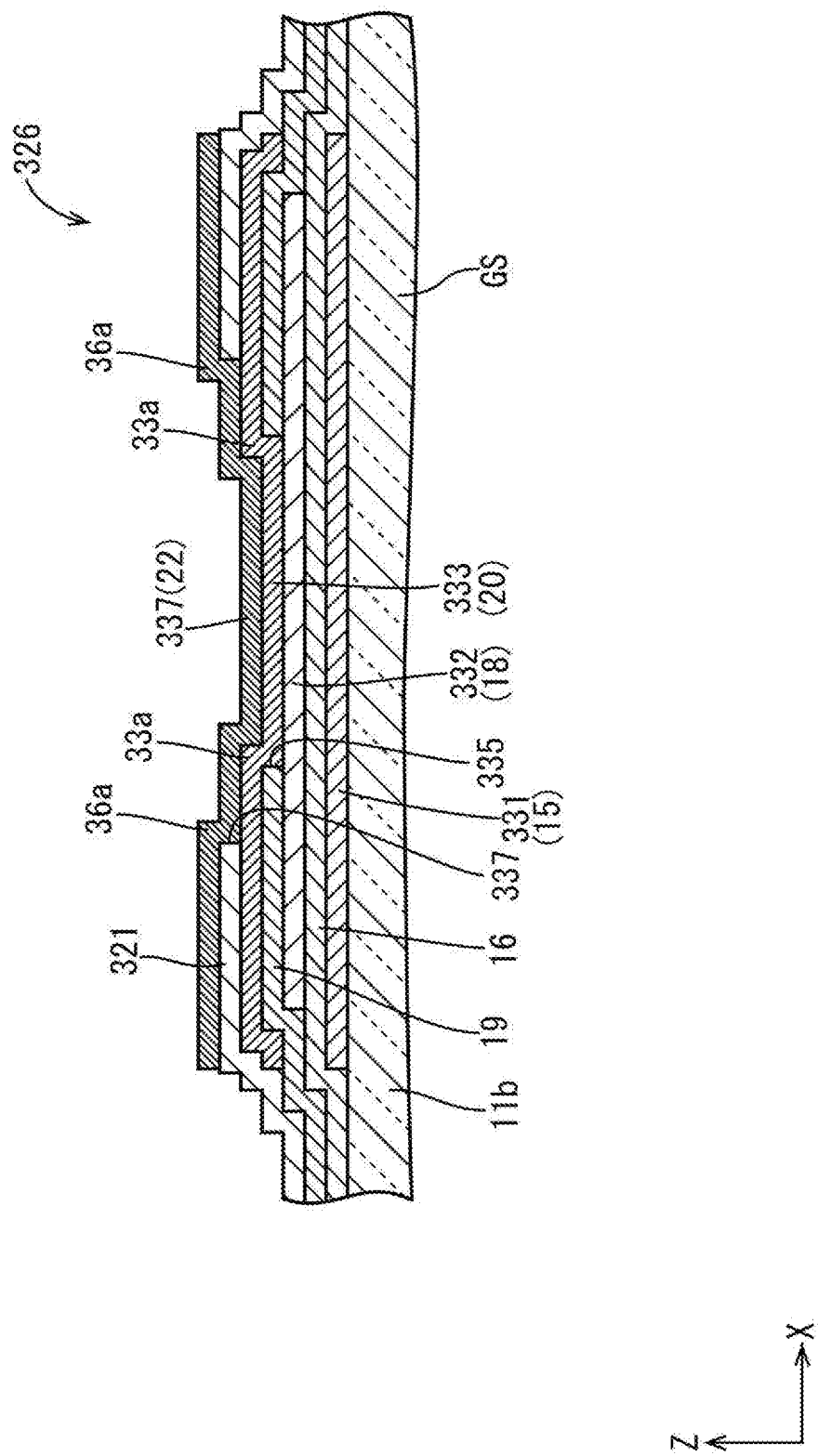
FIG. 22 is a cross-sectional view along a B-B line of FIG. 20.
Figure 23:
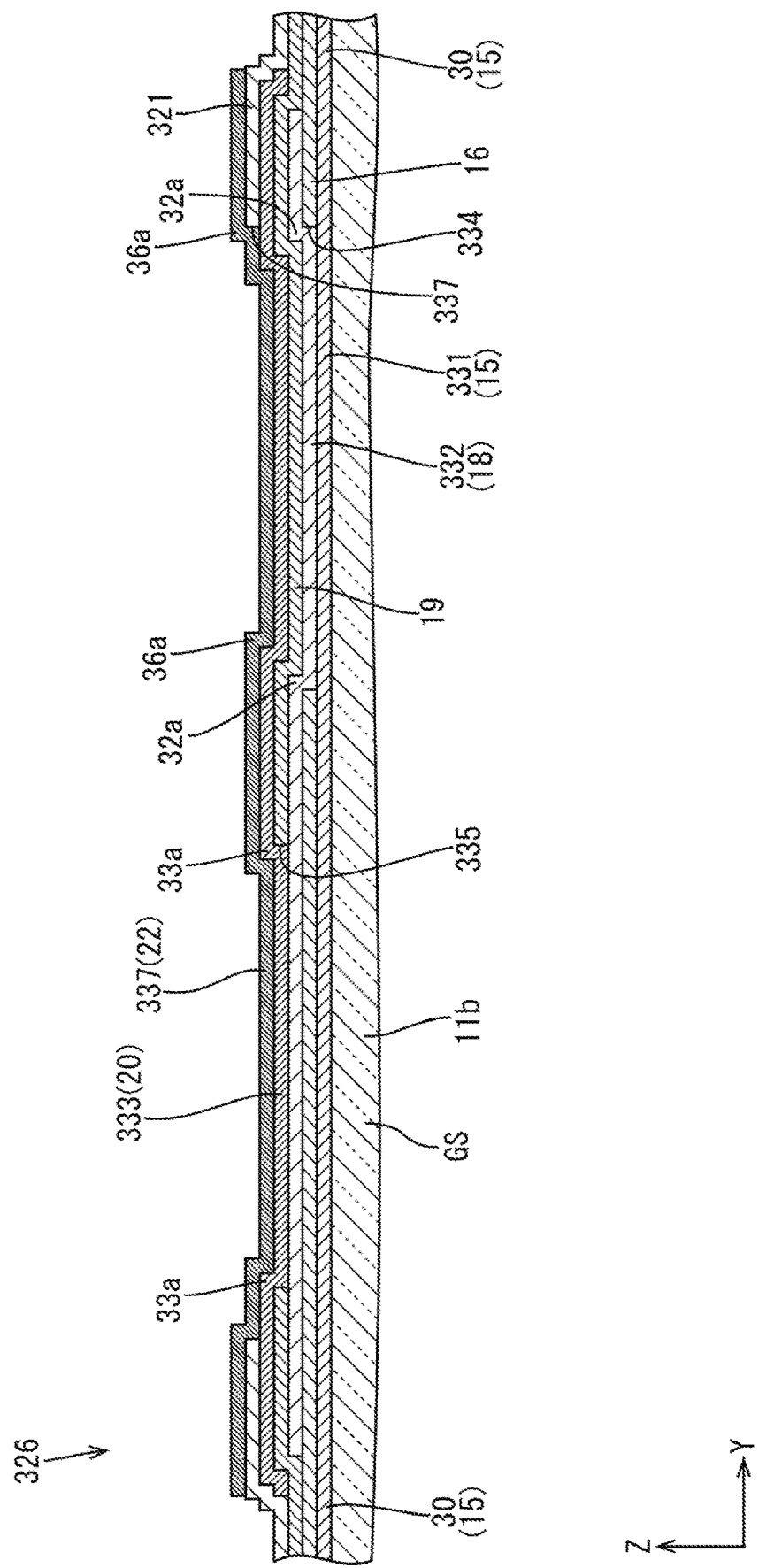
FIG. 23 is a cross-sectional view along a C-C line of FIG. 20.

As shown in FIG. 11 and FIG. 15, a panel side output terminal 126 related to the present embodiment includes, in addition to a first terminal portion 131 made of a first metal film 115, a second terminal portion 132 made of a second metal film 118, and a third terminal portion 133 made of a first transparent electrode film 120, a fourth terminal portion 36 made of a second transparent electrode film 122. In the present embodiment, the second transparent electrode film 122 constituting a fourth terminal portion 36 is made of the same material (for example ITO) as the first transparent electrode film 120 constituting the third terminal portion 133. When the first transparent electrode film 120 and the second transparent electrode film 122 are made of the same material like this, when producing the array substrate 111b, it is difficult to selectively remove only any one of the first transparent electrode film 120 and the second transparent electrode film 122 by etching, therefore, in the present embodiment, the panel side output terminal 126 is formed into a four layer structure.

Figure 14:
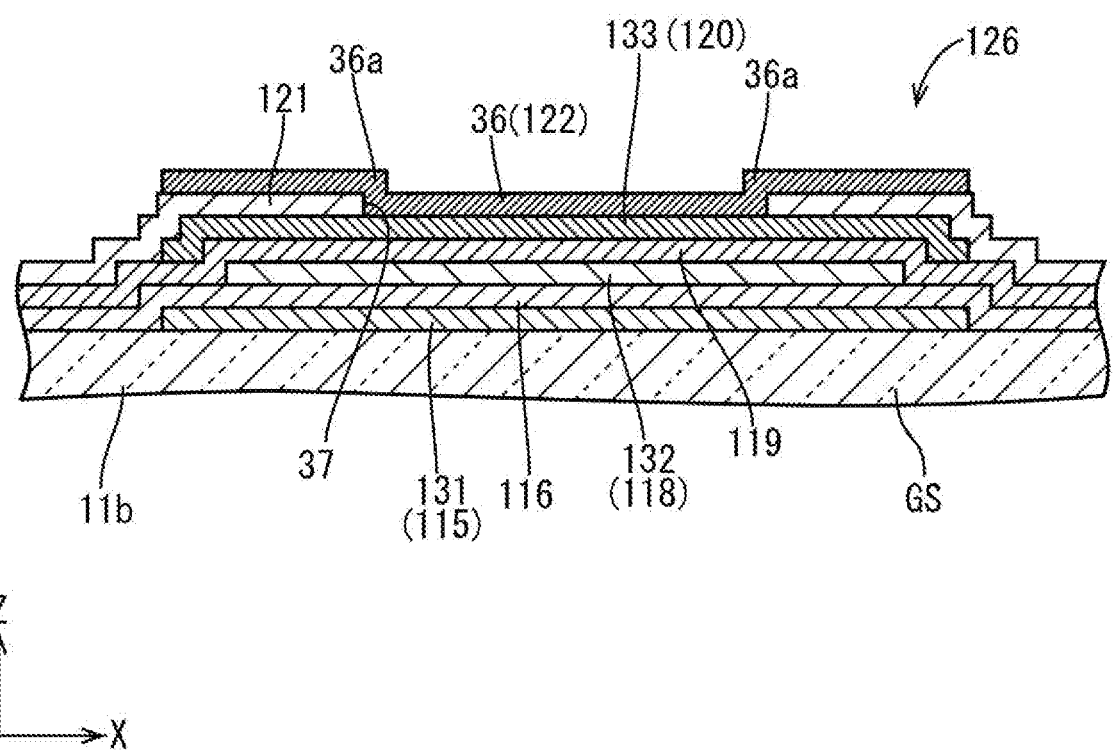
FIG. 14 is a cross-sectional view along a C-C line of FIG. 11.

As shown in FIG. 14 and FIG. 15, the fourth terminal portion 36 overlaps in a plan view with and is connected via a third contact hole 37 formed by opening in the second interlayer insulation film 121 to at least the third terminal portion 133. Accordingly, the panel side output terminal 126 has a constitution where in addition to that the first terminal portion 131, the second terminal portion 132 and the third terminal portion 133 are connected each other, the fourth terminal portion 36 made of the second transparent electrode film 122 is connected to the third terminal portion 133 via the third contact hole 37 formed by opening in the second interlayer insulation film 121. The third contact hole 37 is arranged at a position that overlaps with both the third terminal portion 133 and the fourth terminal portion 36 of the second interlayer insulation film 121. The fourth terminal portion 36 is arranged in the form where its main part overlaps with the third contact hole 37 and an outer periphery edge part overlaps with an opening edge of the third contact hole 37. Accordingly, an outer periphery edge part of the fourth terminal portion 36 is a steep site 36a ridden on the opening edge of the third contact hole 37. Since the fourth terminal portion 36 is arranged in the form of overlapping with the third contact hole 37 and its opening edge, even when a position of the fourth terminal portion 36 fluctuates a little to the third contact hole 37 due to production reason, the fourth terminal portion 36 may be inserted over an entire area of the third contact hole 37, thus a contact area between the third terminal portion 132 and the fourth terminal portion 36 may be maintained constant.

Then, as shown in FIG. 11 and FIG. 15, the gate insulation film 116, the first interlayer insulation film 119 and the second interlayer insulation film 121 related to the present embodiment are formed to be an arrangement where the first contact hole 134 and the second contact hole 135 and the third contact hole 37 do not overlap each other. Specifically, the first contact hole 134 and the second contact hole 135 and the third contact hole 37 are arranged in juxtaposition with a clearance along a Y-axis direction that is a long side direction of the panel side output terminal 126. The respective contact holes 134, 135, 37 have a vertically long square shape in a plan view in the same manner as a contour shape of the panel side output terminal 126, and their dimensions of the long side are set smaller than at least one third of a long side dimension of the panel side output terminal 126.

As was described above, the second terminal portion 132, the third terminal portion 133 and the fourth terminal portion 36 have, as shown in from FIG. 12 to FIG. 15, an arrangement where the respective outer periphery parts overlap with the respective opening edge of the first contact hole 134, the second contact hole 135 and the third contact hole 37, and, have step sites 132a, 133a, 36a due to this arrangement. When while adopting a constitution like this, the first contact hole 134, the second contact hole 135 and the third contact hole 37 are arranged at positions that do not overlap each other, an overlapping amount of the second terminal portion 132 with the opening edge of the first contact hole 134 in the gate insulation film 116 may be set irrespective of the opening edge of the second contact hole 135 in the first interlayer insulation film 119, an overlapping amount of the third terminal portion 133 with the opening edge of the second contact hole 135 in the first interlayer insulation film 119 may be set irrespective of the opening edge of the third contact hole 37 in the second interlayer insulation film 121. That is, in the case where the first contact hole, the second contact hole and the third contact hole are tentatively arranged on positions overlapping each other, it is necessary to take care such that the opening edge of the second contact hole in the first interlayer insulation film 119 does not overlap with a step site 132a generated when the second terminal portion 132 inserted in the first contact hole rides on the opening edge of the first contact hole in the gate insulation film 116, it is also necessary to take care such that the opening edge of the third contact hole in the second interlayer insulation film 121 does not overlap with a step site 133a generated when the third terminal portion 133 inserted in the second contact hole rides on the opening edge of the second contact hole in the first interlayer insulation film 119, specifically it is necessary to abundantly secure the overlapping amount of the second terminal portion 132 with the opening edge of the first contact hole in the gate insulation film 116 and to abundantly secure the overlapping amount of the third terminal portion 133 with the opening edge of the second contact hole in the first interlayer insulation film 119. The design like this is performed because if the opening edge of the second contact hole overlaps with the step site 132a of the second terminal portion 132, the overlapped part becomes a large step as a result of addition of film thicknesses of the second metal film 118 and the first interlayer insulation film 119, and thereby the disconnection may be caused in the third terminal portion 133 laminated on an upper layer side thereof, furthermore, if the opening edge of the third contact hole overlaps with the step site 133a of the third terminal portion 133, the overlapped part becomes a large step as a result of addition of film thicknesses of the first transparent electrode film 120 and the second interlayer insulation film 121, and thereby the disconnection may be caused in the fourth terminal portion 36 laminated on an upper layer side thereof. Compared therewith, when the first contact hole 134, the second contact hole 135 and the third contact hole 37 are arranged at positions that do not overlap each other, there is neither need of taking care of arrangement of the opening edge of the second contact hole 135 to the step site 132a of the second terminal portion 132 nor need of taking care of arrangement of the opening edge of the third contact hole 37 to the step site 133a of the third terminal portion 133. Therefore, an overlapping amount of the second terminal portion 132 to the opening edge of the first contact hole 134 in the gate insulation film 116 and an overlapping amount of the third terminal portion 133 to the opening edge of the second contact hole 135 in the first interlayer insulation film 119 may be reduced, respectively. Thus, a formation area of the panel side output terminal 126 becomes smaller to be preferable from the viewpoint of achieving high definition.

As was described above, according to the present embodiment, at least, a second interlayer insulation film (third insulation film) 121 that is arranged on a n upper layer side of the first transparent electrode film 120, the second interlayer insulation film 121 being formed by opening a third contact hole 37 at a position overlapping with the third terminal portion 133, and a fourth terminal portion 36 that is formed of a second transparent electrode film (fourth conductive film) 122 arranged on an upper layer side of the second interlayer insulation film 121 and constitutes the panel side output terminal 126, the fourth terminal portion 36 being arranged in the form of overlapping with the third contact hole 37 and its opening edge and connected to the third terminal portion 133 via the third contact hole 37. In this manner, the panel side output terminal 126 is constituted such that in addition to that the first terminal portion 131, the second terminal portion 132 and the third terminal portion 133 are connected each other, the fourth terminal portion 36 made of the second transparent electrode film 122 is connected to the third terminal portion 133 via the third contact hole 37 formed by opening in the second interlayer insulation film 121.

Furthermore, the gate insulation film 116, the first interlayer insulation film 119 and the second interlayer insulation film 121 are formed such that the first contact hole 134, the second contact hole 135 and the third contact hole 37 are not overlapped with each other. In the case where the first contact hole, the second contact hole and the third contact hole are tentatively arranged at positions overlapping with each other, it is necessary to take care such that the opening edge of the second contact hole in the first interlayer insulation film 119 does not overlap with the step site 132a generated when the second terminal portion 32 inserted into the first contact hole rides on the opening edge of the first contact hole in the gate insulation film 16, and it is necessary to take care such that the opening edge of the third contact hole in the second interlayer insulation film 121 does not overlap with the step site 133a generated when the third terminal portion 133 inserted into the second contact hole rides on the opening edge of the second contact hole in the first interlayer insulation film 119, specifically, it is necessary to secure both an overlapping amount of the second terminal portion 132 to the opening edge of the first contact hole in the gate insulation film 116, and an overlapping amount of the third terminal portion 133 to the opening edge of the second contact hole in the first interlayer insulation film 119 abundant, respectively. Compared therewith, when the first contact hole 134, the second contact hole 135 and the third contact hole 37 are arranged at positions not overlapping with each other, an overlapping amount of the second terminal portion 132 with the opening edge of the first contact hole 134 in the gate insulation film 116, and an overlapping amount of the third terminal portion 133 to the opening edge of the second contact hole 135 in the first interlayer insulation film 116 are may be reduced, respectively. Thus, a formation area of the panel side output terminal 126 formed of the first terminal portion 131, the second terminal portion 132, the third terminal portion 133 and the fourth terminal portion 36 becomes smaller.

Third Embodiment

A third embodiment of the present invention will be described with reference to from FIG. 16 to FIG. 19. In the third embodiment, one in which an arrangement and a formation area of the respective contact holes 234, 235 and 237 are changed from the second Embodiment described above will be shown. By the way, regarding the same structure, action and effect as second embodiment described above, duplicated description will be omitted.

As shown in from FIG. 16 to FIG. 19, a gate insulation film 216, a first interlayer insulation film 219 and a second interlayer insulation film 221 related to the present embodiment are formed such that the first contact hole 234 does not overlap with the second contact hole 235 and the third contact hole 237 but the second contact hole 235 and the third contact hole 237 overlap with each other. Specifically, while the first contact hole 234 is arranged on an upper side shown in FIG. 16 of a Y-axis direction in the panel side output terminal 226, the second contact hole 235 and the third contact hole 237 are arranged on a lower side in the same drawing of the Y-axis direction in the panel side output terminal 226. That is, an arrangement direction of the first contact hole 234, the second contact hole 235 and the third contact hole 237 coincides with a long side direction of the panel side output terminal 236. A dimension of a long side of the first contact hole 234 and dimensions of long sides of the second contact hole 235 and the third contact hole 237 are roughly equal each other, and are smaller than at least one half of a long side dimension of the panel side output terminal 26.

According to the constitution like this, as was described in the second embodiment, compared with a case where the first contact hole 134, the second contact hole 135 and the third contact hole 37 are arranged in one row so as not to overlap each other (see FIG. 11), a formation area of the panel side output terminal 226 of an arrangement direction of the respective contact holes 234, 235 and 237 may be made smaller.

As was described above, according to the present embodiment, the second interlayer insulation film 221 is formed such that the third contact hole 237 overlaps at least with the second contact hole 235. In this manner, compared with a case where the first contact hole, the second contact hole and the third contact hole are arranged tentatively in a row not so as to overlap each other, a formation area of the panel side output terminal 226 in an arrangement direction with the first contact hole 234 and the second contact hole 235 may be made smaller.

Fourth Embodiment

A fourth embodiment of the present invention will be described with reference to from FIG. 20 to FIG. 23. In the fourth embodiment, one in which a formation area of the third contact hole 237 is changed from the third embodiment described above will be shown. By the way, regarding the same structure, action and effect as third embodiment described above, duplicated description will be omitted.

As shown in from FIG. 20 to FIG. 23, the second interlayer insulation film 321 related to the present embodiment is formed such that the third contact hole 337 overlaps with, in addition to the second contact hole 335, also the first contact hole 334. Specifically, the third contact hole 337 has a formation area that straddles the first contact hole 334 and the second contact hole 335 aligned vertically shown in FIG. 20 in the Y-axis direction in the panel side output part terminal 326. The third contact hole 337 has a long side dimension thereof that is smaller than a long side dimension of the panel side output terminal 326 but is two-times or larger each of the long side dimensions of the first contact hole 334 and the second contact hole 335.

Here, the third terminal portion 333 and the fourth terminal portion 336 connected via the third contact hole 337 are constituted of the first transparent electrode film 320 and the second transparent electrode film 322 both of which are made of a transparent electrode material. Therefore, the electric resistance between the third terminal portion 333 and the fourth terminal portion 336 tends to be larger than the electric resistance between the first terminal portion 331 and the second terminal portion 332 and the electric resistance between the second terminal portion 332 and the third terminal portion 333. With respect to the point, as was described above, by making the third contact hole 337 overlap with, in addition to the second contact hole 335, also the first contact hole 334, a contact area of the fourth terminal portion 336 to the third terminal portion 333 becomes large, thus, the electric resistance related to the panel side output terminal 326 may be reduced.

As was described above, according to the present embodiment, each of the first transparent electrode film 320 that is a third conductive film and the second transparent electrode film 322 that is a fourth conductive film is formed into a transparent electrode film, and the second interlayer insulation film 321 is formed such that the third contact hole 337 overlaps also with the first contact hole 334. In a constitution where each of the first transparent electrode film 320 and the second transparent electrode film 322 is formed into a transparent electrode film, the electric resistance between the third terminal portion 333 and the fourth terminal portion 336 tends to be larger. With respect to the point, by making the third contact hole 337 overlap with, in addition to the second contact hole 335, also the first contact hole 334, a contact area of the fourth terminal portion 336 to the third terminal portion 333 becomes larger, thus, the electric resistance related to the panel side output terminal 326 may be reduced.

Fifth Embodiment

A fifth embodiment of the present invention will be described with reference to FIG. 24 or FIG. 25. In the fifth embodiment, one in which an opening area of each of contact holes 434, 435, 437 is changed from the second Embodiment described above will be shown. By the way, regarding the same structure, action and effect as second embodiment described above, duplicated description will be omitted.

Figure 24:
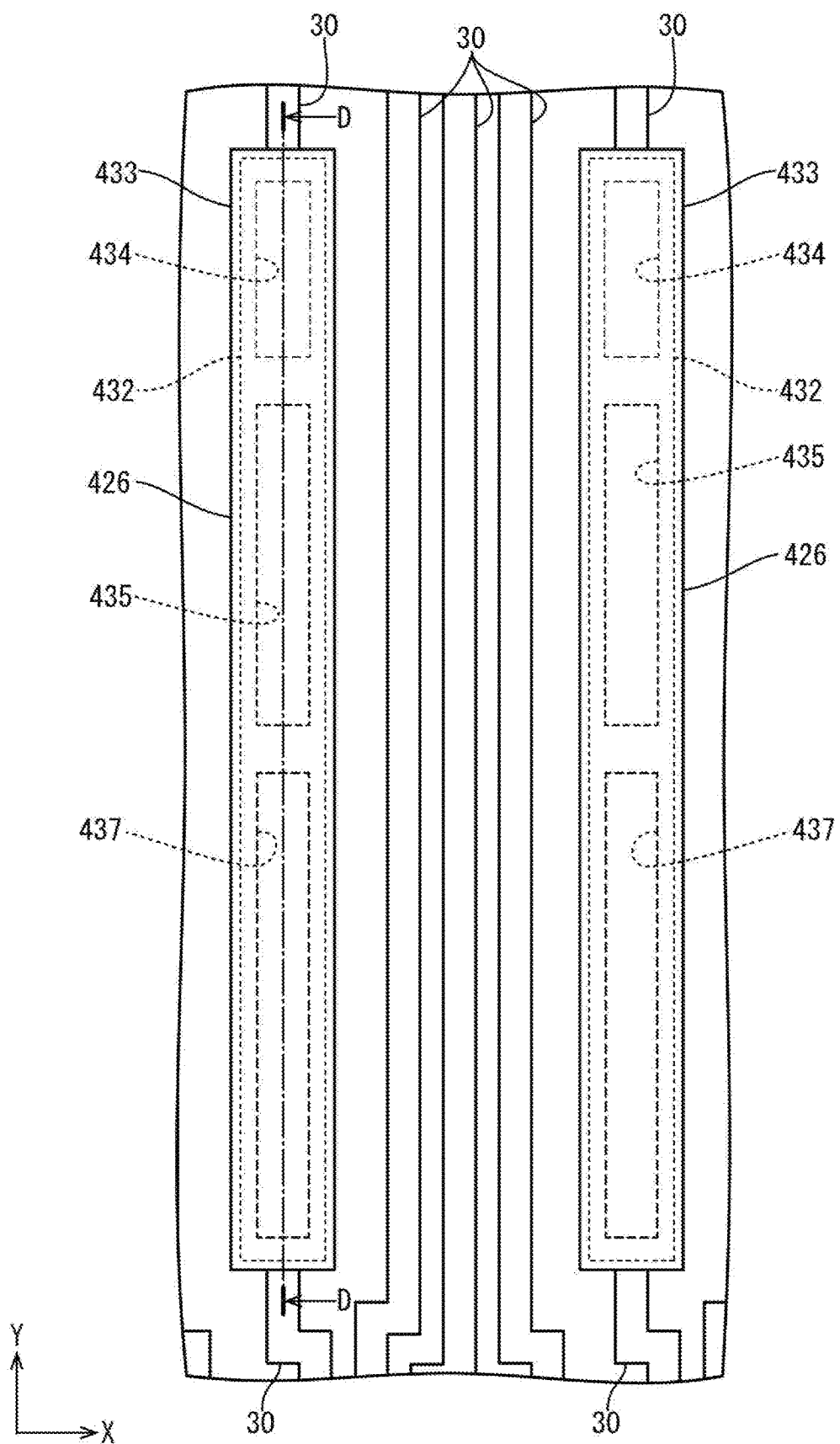
FIG. 24 is a plan view of a panel side output terminal related to fifth Embodiment of the present invention.
Figure 25:
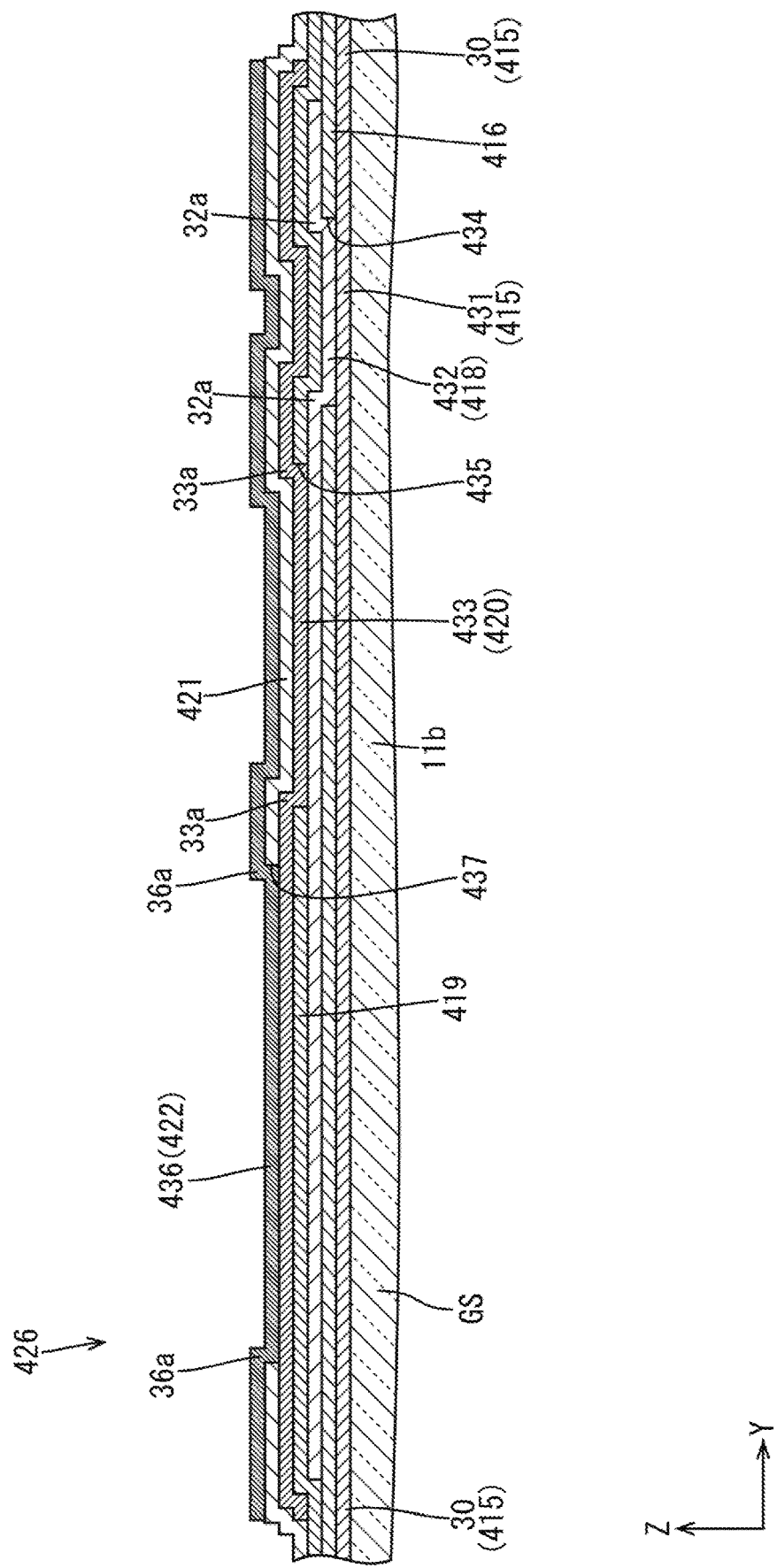
FIG. 25 is a cross-sectional view along a D-D line of FIG. 24.

As shown in FIG. 24 and FIG. 25, a gate insulation film 416, a first interlayer insulation film 419 and a second interlayer insulation film 421 related to the present embodiment are formed such that opening areas of the respective contact holes 434, 435, 437 are different from each other. Specifically, the first contact hole 434 has a minimum dimension of the long side, and, accompanying this, the opening area also becomes minimum. By contrast, the third contact hole 437 has the maximum dimension of the long side, and, accompanying this, the opening area becomes maximum. The second contact hole 435 has a dimension of the long side larger than that of the first contact hole 434 but smaller than that of the third contact hole 437, and, accompanying this, also the opening area is larger than the first contact hole 434 but is smaller than the third contact hole 437.

Here, the first terminal portion 431 and the second terminal portion 432 connected via the first contact hole 434 are constituted of a first metal film 415 and a second metal film 418 both made of a metal material. By contrast, the second terminal portion 432 and the third terminal portion 433 connected via the second contact hole 435 are constituted of a second metal film 418 made of a metal material and a first transparent electrode film 420 made of a transparent electrode material, respectively. Furthermore, the third terminal portion 433 and the fourth terminal portion 436 connected via the third contact hole 437 are constituted of a first transparent electrode film 420 and a second transparent electrode film 422 both made of a transparent electrode material. Therefore, if all contact areas between the respective terminal portions are same, while the electric resistance between the first terminal portion 431 and the second terminal portion 432 become minimum, the electric resistance between the third terminal portion 433 and the fourth terminal portion 436 become maximum, furthermore, the electric resistance between the second terminal portion 432 and the third terminal portion 433 becomes an intermediate value of these. With respect to the point, as was described above, when the opening area of the first contact hole 434 is made minimum and the opening area of the third contact hole 437 is made maximum, by making the contact area between the first terminal portion 431 and the second terminal portion 432, which have intrinsically small electric resistance stay at a minimum limit, by this part, the contact area between the third terminal portion 433 and the fourth terminal portion 436 which have intrinsically large electric resistance may be secured to a maximum limit. Thus, the electric resistance of the panel side output terminal 426 may be reduced.

As was described above, according to the present embodiment, the first metal film 415 that is the first conductive film and the second metal film 418 that is the second conductive film each are formed into a metal film, the first transparent electrode film 420 that is the third conductive film and the second transparent electrode film 422 that is the fourth conductive film each are formed into a transparent electrode film, and the gate insulation film 416, the first interlayer insulation film 419 and the second interlayer insulation film 421 are formed such that the opening area of the first contact hole 434 becomes minimum and the opening area of the third contact hole 437 becomes maximum. In a constitution where the first metal film 415 and the second metal film 418 each are formed into a metal film, and the first transparent electrode film 420 and the second transparent electrode film 422 each are formed into a transparent electrode film, when all the contact areas are same, the electric resistance between the first terminal portion 431 and the second terminal portion 432 becomes minimum, and the electric resistance between the third terminal portion 433 and the fourth terminal portion 436 becomes maximum. By contrast, as was described above, since the opening area of the first contact hole 434 is minimum and the opening area of the third contact hole 437 is maximum, by making the contact area between the first terminal portion 431 and the second terminal portion 432, which have intrinsically small electric resistance stay at a minimum limit, by this part, the contact area between the third terminal portion 433 and the fourth terminal portion 436 which have intrinsically large electric resistance may be secured to a maximum limit. Thus, the electric resistance of the panel side output terminal 426 may be reduced.

Sixth Embodiment

A sixth embodiment of the present invention will be described with reference to FIG. 26 or FIG. 27. In the sixth embodiment, one in which a constitution of each of contact holes 534, 535, 537 is changed from the second embodiment described above will be shown. By the way, regarding the same structure, action and effect as second embodiment described above, duplicated description will be omitted.

Figure 26:
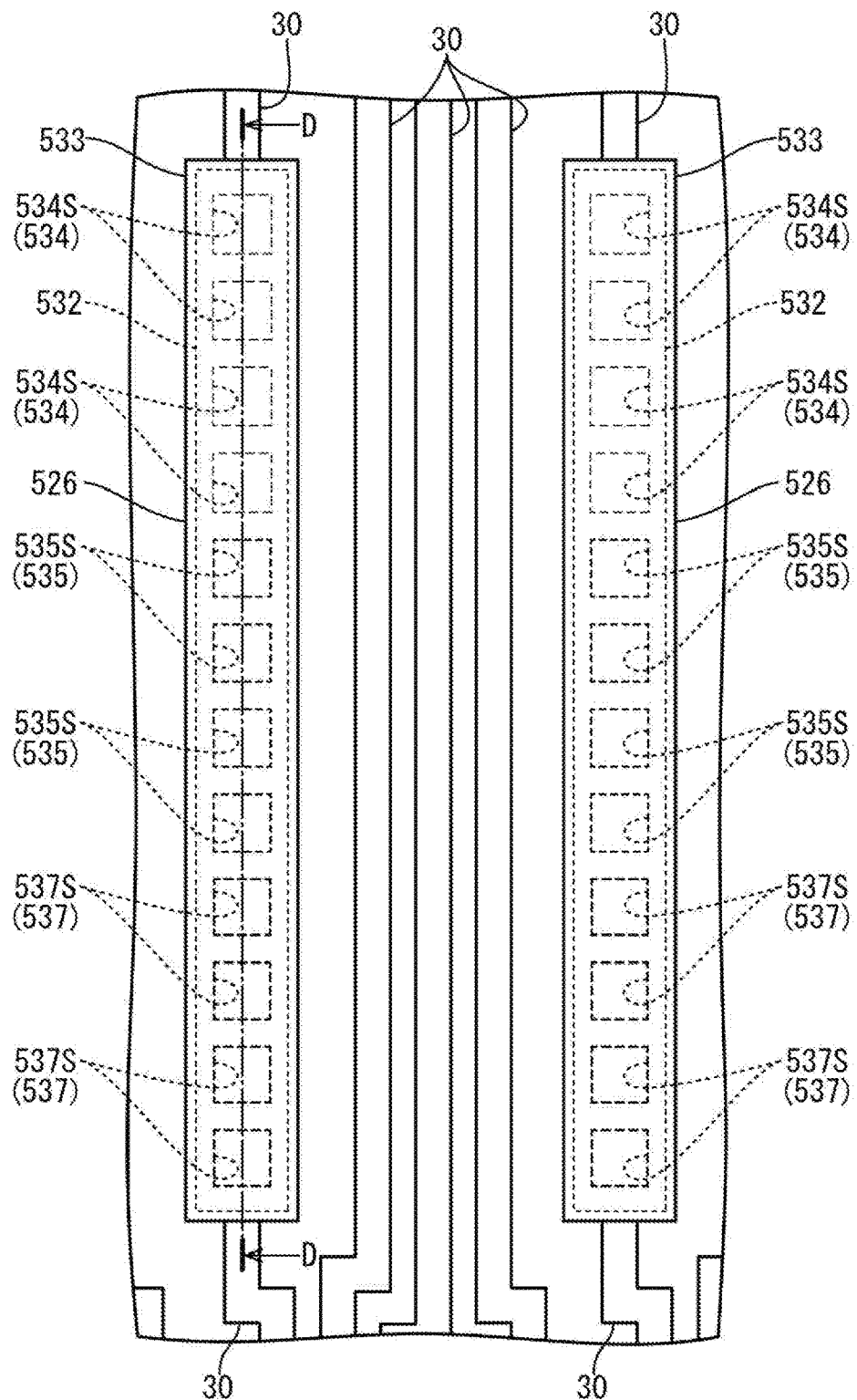
FIG. 26 is a plan view of a panel side output terminal related to sixth Embodiment of the present invention.
Figure 27:
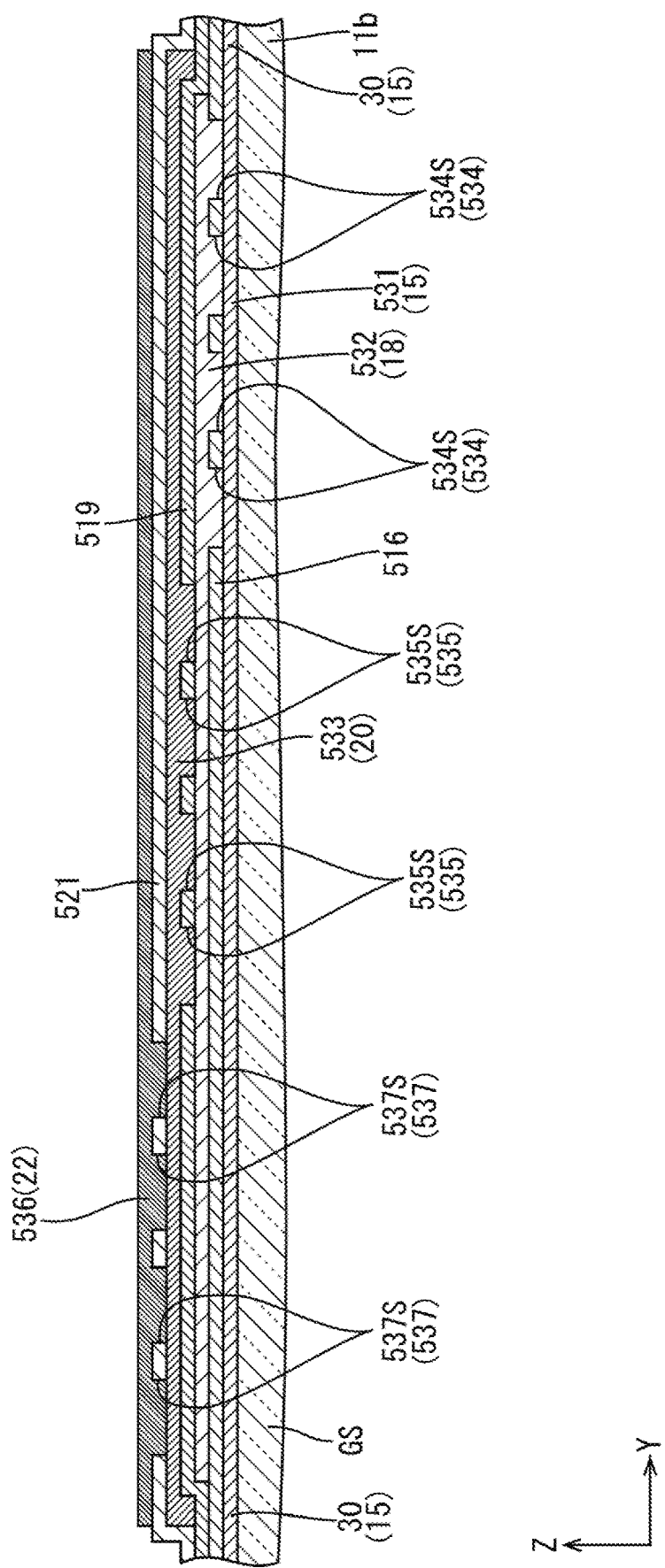
FIG. 27 is a cross-sectional view along a D-D line of FIG. 26.

As shown in FIG. 26 and FIG. 27, a gate insulation film 516, a first interlayer insulation film 519 and a second interlayer insulation film 521 related to the present embodiment are formed such that each of the contact holes 534, 535, 537 is constituted of a plurality of division contact holes 534S, 535S, 537S. Specifically, the first contact hole 534 is constituted of four first division contact holes (division contact hole) 534S aligned with a clearance along a Y-axis direction (a long side direction of the panel side output terminal 526). The second contact hole 535 is constituted of four two-division contact holes (division contact hole) 535S aligned with a clearance along a Y-axis direction. The third contact hole 537 is constituted of four three-division contact holes (division contact hole) 537S aligned with a clearance along a Y-axis direction. Thus, in the panel side output terminal 526, twelve in total division contact holes 534S, 535S, 537S are arranged in one row in juxtaposition. The division contact holes 534S, 535S, 537S each have a rough square shape in a plan view, and a dimension of its Y-axis direction has at least a dimension smaller than one twelves the long side dimension of the panel side output side terminal 526.

The second terminal portion 532 is connected to the first terminal portion 531 via four first division contact holes 534S constituting the first contact hole 534. In the second terminal portion 532, a part located between parts that are inserted to each first division contact hole 534S is arranged on an upper layer side of a part intervening between adjacent first division contact holes 534S of the gate insulation film 516, as a whole, the flatness of a surface is secured. Similarly, the third terminal portion 533 is connected to the second terminal portion 532 via four second division contact holes 535S constituting the second contact hole part 535. In the third terminal portion 533, since a part located between parts that are inserted to each second division contact hole 535S is arranged on an upper layer side of a part intervening between adjacent second division contact holes 535S of the first interlayer insulation film 519, as a whole, the flatness of a surface is secured. The fourth terminal portion 536 is connected to the third terminal portion 533 via four three-division contact hole 537S constituting the third contact hole 537. In the fourth terminal portion 536, since a part located between parts that are inserted to each of the third division contact holes 537S is arranged on an upper layer side of a part intervening adjacent third division contact holes 537S of the second interlayer insulation film 521, as a whole, the flatness of a surface is secured.

As was described above, according to the present embodiment, the gate insulation film 516, the first interlayer insulation film 519 and the second interlayer insulation film 521 are formed such that at least any one of the first contact hole 534, the second contact hole 535 and the third contact hole 537 is formed of a plurality of division contact holes 534S, 535S, 537S arranged in juxtaposition with a clearance. In this manner, at least any one of the second terminal portion 532, the third terminal portion 533 and the fourth terminal portion 536 is connected to at least any one of the first terminal portion 531, the second terminal portion 532 and the third terminal portion 533 via a plurality of division contact holes 534S, 535S, 537S aligned with a clearance. In at least any one of the second terminal portion 532, the third terminal portion 533 and the fourth terminal portion 536, since a part located between parts that are inserted to each division contact holes 534S, 535S, 537S is arranged on an upper layer side of a part intervening between adjacent division contact holes 534S, 535S, 537S of at least any one of the gate insulation film 516, the first interlayer insulation film 519 and the second interlayer insulation film 521, as a whole, the flatness of a surface is secured.

Seventh Embodiment

A seventh embodiment of the present invention will be described with reference to FIG. 28 or FIG. 29. In the seventh embodiment, one in which an opening area of each of contact holes 634, 635 is changed from the above first embodiment in the same manner as the above fifth embodiment will be shown. By the way, regarding the same structure, action and effect as first embodiment described above, duplicated description will be omitted.

Figure 28:
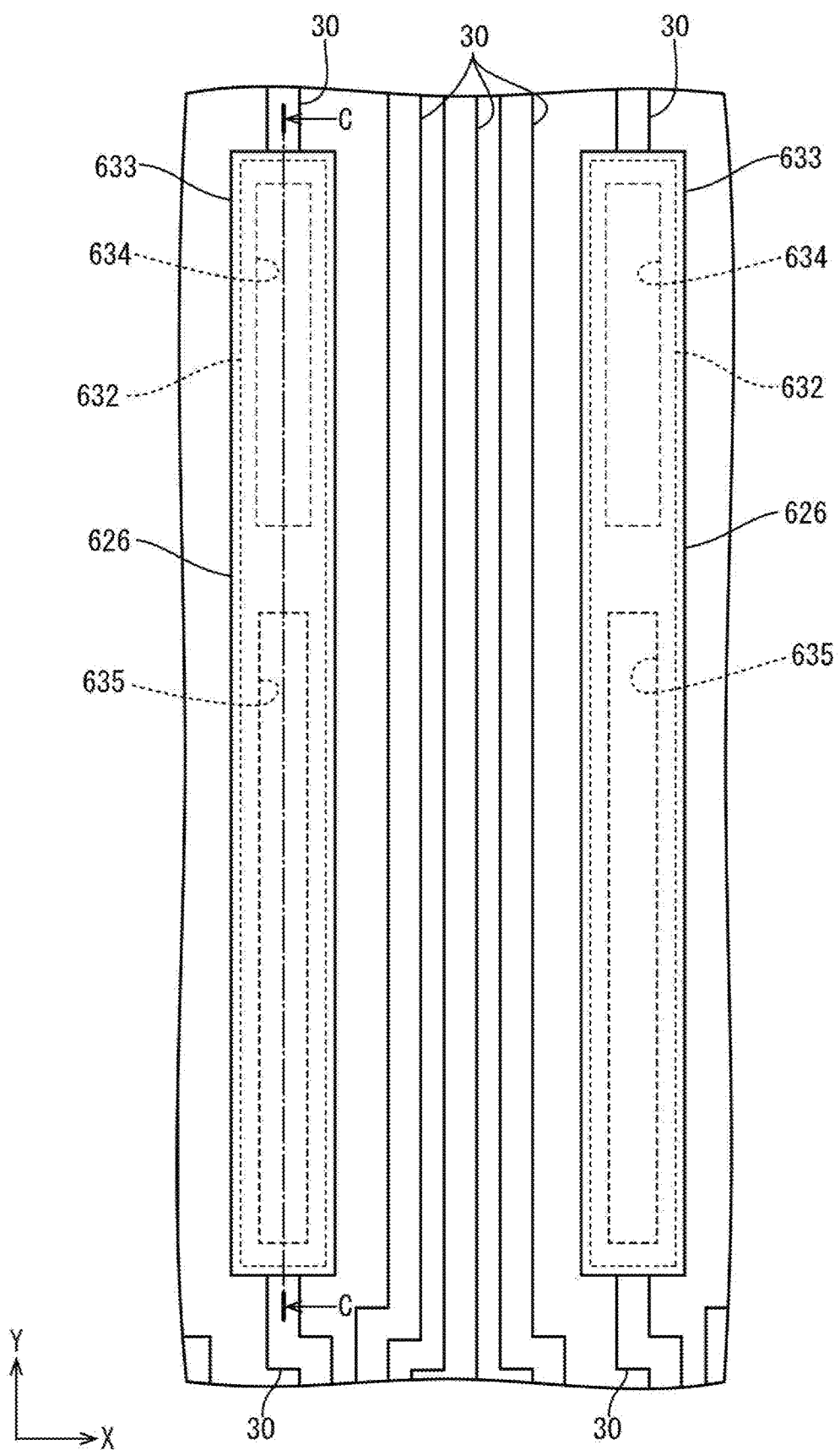
FIG. 28 is a plan view of a panel side output terminal related to seventh Embodiment of the present invention.
Figure 29:
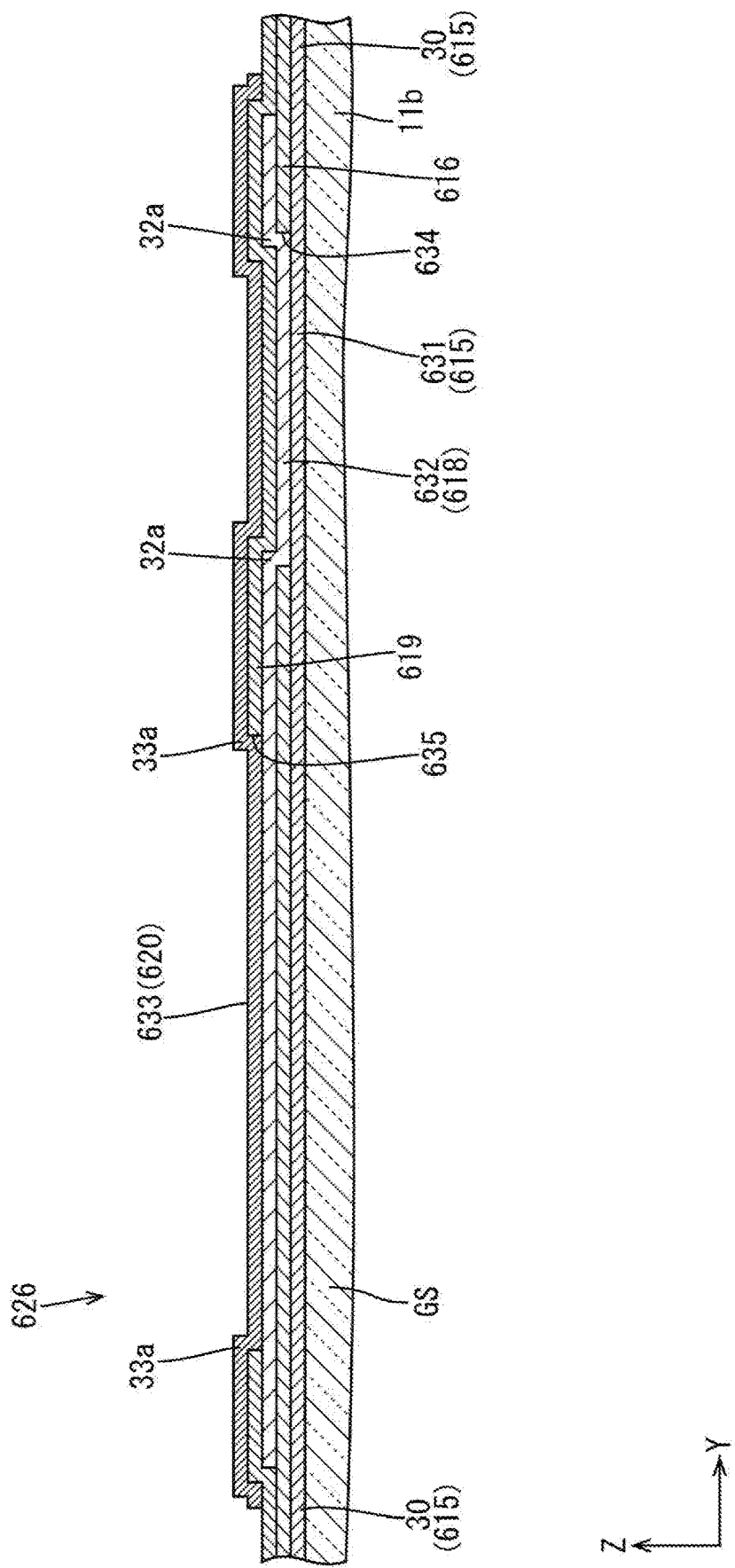
FIG. 29 is a cross-sectional view along a C-C line of FIG. 28.

As shown in FIG. 28 and FIG. 29, the gate insulation film 616 and the first interlayer insulation film 619 related to the present embodiment are formed such that opening areas of the respective contact holes 634, 635 are different each other. Specifically, the first contact hole 634 has relatively small long side dimension and opening area. By contrast, the second contact hole 635 has relatively large long side dimension and opening area. Here, the first terminal portion 631 and the second terminal portion 632 connected via the first contact hole 634 are constituted of the first metal film 615 and the second metal film 618 both made of the metal material. By contrast, the second terminal portion 632 and the third terminal portion 633 connected via the second contact hole 635 are constituted of the second metal film 618 made of a metal material and the first transparent electrode film 620 made of the transparent electrode material, respectively. Thus, if all the contact areas between the respective terminal portions are same, while the electric resistance between the first terminal portion 631 and second terminal portion 632 becomes relatively small, the electric resistance between the second terminal portion 632 and third terminal portion 633 becomes relatively large. With respect to the point, as was described above, when the opening area of the first contact hole 634 is made relatively small, and the opening area of the second contact hole 635 is made relatively large, by making the contact area between the first terminal portion 631 and the second terminal portion 632, which have intrinsically small electric resistance stay at a small value, by this part, the contact area between the third terminal portion 633 and the fourth terminal portion 636 which have intrinsically large electric resistance may be secured large. Thus, the electric resistance of the panel side output terminal 626 may be reduced.

As was described above, according to the present embodiment, the first metal film 615 that is the first conductive film and the second metal film 618 that is the second conductive film each are formed into a metal film, the first transparent electrode film 620 that is the third conductive film is formed into a transparent electrode film, and the gate insulation film 616 and the first interlayer insulation film 619 are formed such that the opening area of the second contact hole 635 is larger than the opening area of the first contact hole 634. In a constitution where the first metal film 615 and the second metal film 618 each are formed into the metal film and the first transparent electrode film 620 is formed into the transparent electrode film, if all contact areas are same, the electric resistance between the first terminal portion 631 and the second terminal portion 632 becomes smaller than the electric resistance between the second terminal portion 632 and the third terminal portion 633. By contrast, as was described above, since the opening area of the second contact hole 635 is formed larger than the opening area of the first contact hole 634, by making the contact area between the first terminal portion 631 and second terminal portion 632, which have intrinsically small electric resistance stay small, by it portion the contact area between the second terminal portion 632 and third terminal portion 633, which have intrinsically large electric resistance may be secured large. Thus, the electric resistance of the panel side output terminal 626 may be reduced.

Eighth Embodiment

An eighth embodiment of the present invention will be described with reference to FIG. 30 or FIG. 31. In the eighth embodiment, one obtained by changing a constitution of each of the contact holes 734 and 735 from the above first embodiment similarly as the above sixth embodiment will be shown. By the way, regarding the same structure, action and effect as first embodiment described above, duplicated description will be omitted.

Figure 30:
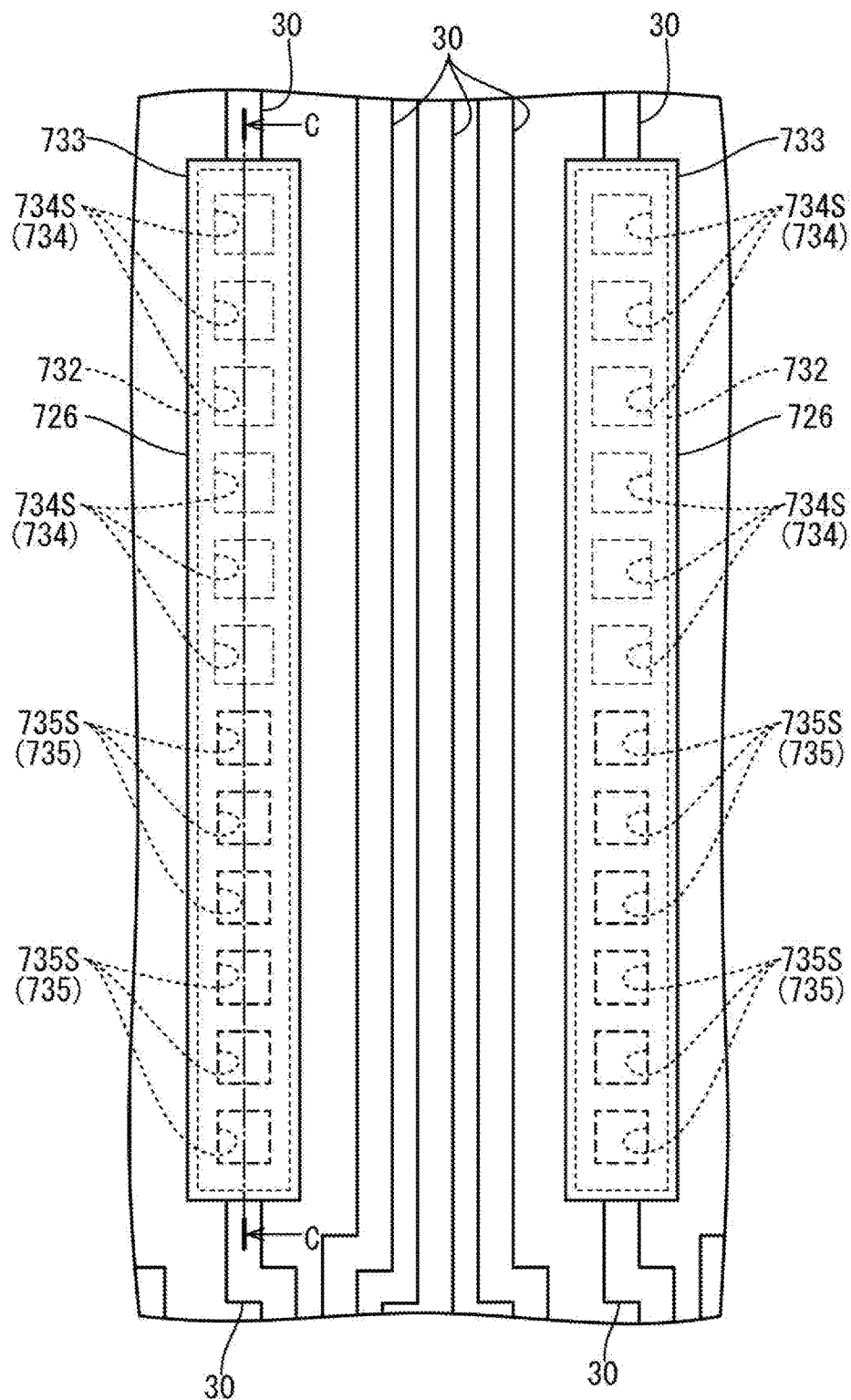
FIG. 30 is a plan view of a panel side output terminal related to eighth Embodiment of the present invention.
Figure 31:
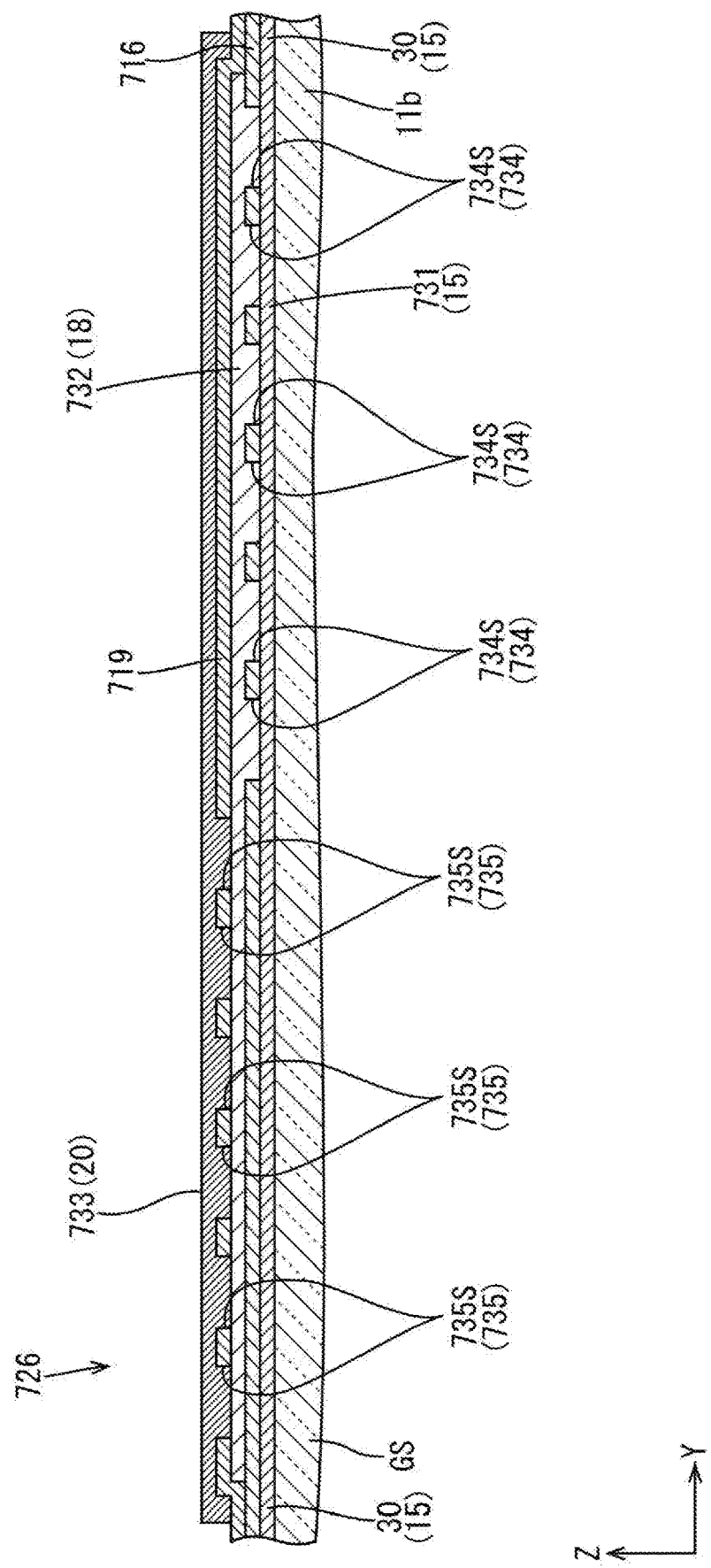
FIG. 31 is a cross-sectional view along a C-C line of FIG. 30.

As shown in FIG. 30 and FIG. 31, a gate insulation film 716 and a first interlayer insulation film 719 related to the present embodiment are formed such that the contact holes 734 and 735 each are constituted of a plurality of division contact holes 734S, 735S. Specifically, the first contact hole 734 is constituted of six first division contact holes 734S aligned with a clearance along a Y-axis direction (a long side direction of the panel side output terminal 726). The second contact hole 735 is constituted of six second division contact holes 735S aligned with a clearance along a Y-axis direction. Thus, in the panel side output terminal 726, in total, twelve division contact holes 734S, 735S are provided in juxtaposition in one row. The division contact holes 734S, 735S each are formed into a rough square shape in a plan view, and a dimension in the Y-axis direction is made smaller than at least one twelfth the long side dimension of the panel side output terminal 726.

The second terminal portion 732 is connected to the first terminal portion 731 via six first division contact holes 734S constituting the first contact hole 734. In the second terminal portion 732, since a part located between parts that are inserted to each of the first division contact holes 734S is arranged on an upper layer side of a part intervening between adjacent first division contact holes 734S of the gate insulation film 716, as a whole, the flatness of a surface is secured. Similarly, the third terminal portion 733 is connected to the second terminal portion 732 via six second division contact holes 735S constituting the second contact hole part 735. In the third terminal portion 733, since a part located between parts that are inserted to each second division contact hole 735S is arranged on an upper layer side of a part intervening between adjacent second division contact holes 735S of the first interlayer insulation film 719, as a whole, the flatness of a surface is secured.

Other Embodiments

The present invention is not limited to embodiments described above and with the drawings, but, for example, also the following embodiments are included in the technical range of the present invention.

(1) In the respective embodiments described above, a constitution of a panel side output terminal in which a signal is outputted from a driver was exemplified. However, a constitution of a panel side terminal for a flexible substrate connected to a panel side input terminal for inputting a signal to a driver or the flexible substrate may be made into the similar constitution as the above-described panel side output terminal. In this manner, to make a width dimension or an arrangement clearance of each terminal narrower accompanying further higher definition is preferably achieved.

(2) In the embodiments 1, 7, 8 described above, a case where a first transparent electrode film is made of a transparent electrode material such as IZO and a second transparent electrode film is made of a transparent electrode material such as ITO was shown. However, there is no problem when a first transparent electrode film is made of a transparent electrode material such as ITO and a second transparent electrode film is made of a transparent electrode material such as IZO.

(3) In the embodiments 2 to 6 described above, a case where both the first transparent electrode film and the second transparent electrode film are made of the transparent electrode material such as ITO was shown. However, both the first transparent electrode film and the second transparent electrode film may be formed of a transparent material such as IZO. Furthermore, the first transparent electrode film and the second transparent electrode film may be formed of different transparent electrode materials. Specifically, a constitution where among the first transparent electrode film and the second transparent electrode film, one may be made of ITO or the like, and the other may be made of IZO or the like.

(4) In the third embodiment described above, a case where the second contact hole and the third contact hole overlap each other but do not overlap with the first contact hole was shown. However, a constitution where the first contact hole and the second contact hole overlap each other but do not overlap with the third contact hole may be adopted. Furthermore, a constitution where the first contact hole and the third contact hole overlap each other but do not overlap with the second contact hole may be adopted.

(5) The constitutions described in the embodiments 3, 4 may be combined with the constitutions described in embodiments 5, 6.

(6) The constitution described in the fifth embodiment may be combined with the constitutions described in sixth embodiment. Similarly, the constitution described in the embodiments 7 may be combined with the constitutions described in embodiments 8.

(7) In the embodiments 6, 8 described above, a case where the opening areas of the respective division contact holes are made roughly equal is shown. However, one having different opening areas may be contained in the respective division contact holes.

(8) In the embodiments 6, 8 described above, a case where each of the contact holes is formed of a plurality of division contact holes was shown. However, in each contact hole, one formed of a plurality of division contact holes and one that is not divided may be mixed.

(9) In the respective embodiments described above, a case where an arrangement direction of each of contact holes is in parallel with a long side direction of the panel side output terminal was shown. However, a constitution where an arrangement direction of each of contact holes is aligned in an oblique direction to a long side direction of the panel side output terminal or a constitution aligning in the short side direction of the panel side output terminal may be formed.

(10) In the respective embodiments described above, a case where an arrangement that a long side direction of the panel side output terminal that forms an elongated shape and a short side direction coincide with a Y-axis direction and an X-axis direction, respectively is taken was shown. However, it is also possible to form an arrangement where a long side direction of the panel side output terminal that forms an elongated shape and a short side direction coincide with an X-axis direction and a Y-axis direction, respectively.

(11) In the respective embodiments described above, a case where a planar shape of the panel side output terminal is formed into a rectangle was shown. However, a planar shape of the panel side output terminal may be a square, an oval, a circle, an ellipse, or a trapezoid.

(12) Other than the embodiments described above, a specific arrangement related to a plurality of panel side output terminals in a mounting area of the driver may be appropriately changed. For example, a constitution where a plurality of panel side output terminals are not aligned along an oblique direction to the X-axis direction and the Y-axis direction but is aligned with a clearance in the X-axis direction may be formed. Furthermore, an arrangement number of the panel side output terminal aligning along an oblique direction to the X-axis direction and Y-axis direction may be changed to other than 4 (2, 3, or 5 or more).

(13) In the respective embodiments described above, a constitution where main parts (center side part) of all terminal portions constituting the panel side output terminal overlap with each other was shown. However, a constitution where main parts of each of terminal portions do not partially overlap may be formed.

(14) In the respective embodiments described above, a case where the first metal film and the second metal film are made of the same material and formed into the same structure was shown. However, the first metal film and the second metal film may be made of different materials, and may have different structures (lamination order or lamination number in the case of a laminate film).

(15) In the respective embodiments described above, a case where "the first conductive film" is formed into a first metal film was exemplified, however it is also possible to form "the first conductive film" into the second metal film. In this case, "the second conductive film" becomes the first transparent electrode film, "the third conductive film" becomes the second transparent electrode film, "the first insulation film" becomes the first interlayer insulation film, and "the second insulation film" becomes the second interlayer insulation film.

(16) In the respective embodiments described above, a case where the lead-out wiring lead out to a display area side from the panel side output terminal is directly connected to the source line was exemplified, however, a structure where the lead-out wiring is indirectly connected to the source line via a circuit part (RGB switch circuits and the like) provided monolithically on, for example, the array substrate may be adopted. In a constitution where the lead-out wiring is connected to the source line via the RGB switch circuit part, an output signal may be supplied to the source lines of three times the installation number of the panel side output terminal and the lead-out wirings to be more preferable for higher definition.

(17) In the respective embodiments described above, a case where the lead-out wiring is lead-out to both a display area side and an opposite side thereof (an inspection terminal side) from the panel side output terminal was shown. However, a constitution where the lead-out wiring is lead-out from the panel side output terminal only to the display area side may be formed.

(18) In the respective embodiments described above, a case where the lead-out wiring is made of the first metal film was shown. However, the lead-out wiring may be formed of the second metal film.

(19) In the respective embodiments described above, a case where all the lead-out wirings are formed of the first metal film was exemplified, however, the lead-out wirings made of the first metal film and the lead-out wirings made of the second metal films may be present in a mixed state. Specifically, a constitution where odd numbered lead-out wirings and even numbered lead-out wirings when counted from the edge are made of different metal films may be adopted, and a clearance between adjacent lead-out wirings may be made narrower or almost devoid thereby to be more preferable from the viewpoint of achieving higher definition.

(20) In the respective embodiments described above, a case where three layers of insulation films of the gate insulation film, the first interlayer insulation film and the second interlayer insulation film are provided was shown. However, a constitution having four or more layers of insulation films may be adopted. In this case, a flattening film made of an organic material (such as acryl resin) may be added, for example, on an upper layer side of the first interlayer insulation film and on a lower layer side of the first transparent electrode film.

(21) In the respective embodiments described above, a case where all the insulation films are made of inorganic materials was shown. However, an organic material (such as acryl resin) may be contained in any one of the insulation films.

(22) Other than the respective embodiments described above, as a specific transparent electrode material of the first transparent electrode film or the second transparent electrode film, ZnO (Zinc Oxide) may be used.

(23) In the respective embodiments described above, a case where a planar shape of the liquid crystal panel is formed into a vertically long square was shown. However, a planar shape of the liquid crystal panel may be a laterally long square, a square, an oval, an ellipse, a circle, or a trapezoid.

(24) In the respective embodiments described above, a liquid crystal panel of which operation mode is set to a FFS mode was exemplified. However, other than this, the present invention can be applied also to a liquid crystal panel in which other operation mode such as an IPS (In-Plane Switching) mode or a VA (Vertical Alignment) mode is applied, Among these, in the liquid crystal panel in which, for example, the VA mode is set, in the constitutions described in the embodiments 1, 7, 8, a constitution that is not provided with the second transparent electrode film and the second interlayer insulation film may be adopted.

(25) In the respective embodiments described above, a case where the driver is COG-mounted to the array substrate of the liquid crystal panel was exemplified, however, a constitution where the driver is COF (Chip On Film)-mounted to a flexible substrate having flexibility may be adopted. In this case, since the flexible substrate becomes the "mounted substrate", the present invention may be applied to any (preferably output terminal) or all of the respective terminals disposed on the flexible substrate and connected to each terminal of the driver.

(26) In the respective embodiments described above, a case where a semiconductor film constituting the channel part of the TFT is made of an oxide semiconductor material was exemplified, however, other than this, for example, polysilicon (CG silicon (Continuous Grain Silicon) that is one kind of polycrystallized silicon (polycrystal silicon)) or amorphous silicon may be used as a material of a semiconductor film.

(27) In the respective embodiments described above, a case where a color filter of the liquid crystal panel has a three-color constitution of red, green and blue was shown. However, the present invention may be applied also to one provided with a color filter of a four color constitution obtained by adding a colored part of a yellow color or a white color to each colored part of red, green and blue.

(28) In the respective embodiments described above, a liquid crystal panel constituted by sandwiching a liquid crystal layer between a pair of substrates and its production method were exemplified. However, the present invention may be applied to a display panel in which a functional organic molecule (a medium layer) other than a liquid crystal material is sandwiched between a pair of substrates.

(29) In the respective embodiments described above, a TFT was used as a switching element of the liquid crystal panel. However, the present invention may be applied also to the liquid crystal panel that uses a switching element other than the TFT (for example, thin film diode (TFD)), and, other than liquid crystal panel that display colors, to liquid crystal panel that perform black and white display.

(30) In the respective embodiments described above, a liquid display panel was exemplified as a display panel. However, the present invention may be applied also to other kinds of display panels (such as PDP (plasma display panel), organic electroluminescent panel, EPD (electrophoresis display panel), MEMS (Micro Electro Mechanical Systems) display panel and so on).

(31) In the embodiments 1, 7, 8 described above, a case where "the third conductive film" is formed into the first transparent electrode film was exemplified. However, "the third conductive film" may be formed into the second transparent electrode film. In this case, at least the first transparent electrode film in the mounted area of the driver is removed, when the first interlayer insulation film and second interlayer insulation film are not removed in the same mounted area, while "the second insulation film" is formed of the first interlayer insulation film and second interlayer insulation film, when the second interlayer insulation film is selectively removed in the same mounted area, "the second insulation film" is formed of the first interlayer insulation film. Furthermore, when the first interlayer insulation film is selectively removed in the same mounting area, "the second insulation film" is made of the second interlayer insulation film.

EXPLANATION OF SYMBOLS

11: liquid crystal panel (display panel)
11a: CF substrate (counter substrate)
11b: array substrate (mounting substrate)
12: driver (mounted component)
14: flexible substrate (mounted component)
15, 115, 415, 615: first metal film (first conductive film)
16, 116, 216, 416, 516, 616, 716: gate insulation film (first insulation film)
18, 118, 418: second metal film (second conductive film)
19, 119, 219, 419, 519, 619, 719: first interlayer insulation film (second insulation film)
20, 120, 320, 420, 620: first transparent electrode film (third conductive film)
21, 121, 221, 321, 421, 521: second interlayer insulation film (third insulation film)
22, 122, 422: second transparent electrode film (fourth conductive film)
25: panel side input terminal (terminal, input terminal)
26, 126, 226, 326, 426, 526, 626, 726: panel side output terminal (terminal, output terminal)
31, 131, 331, 431, 531, 631, 731: first terminal portion
32, 132, 332, 432, 532, 632, 732: second terminal portion
33, 133, 333, 433, 533, 633, 733: third terminal portion
34, 134, 234, 334, 434, 534, 634, 734: first contact hole
35, 135, 235, 335, 435, 535, 635, 735: second contact hole
36, 336, 436, 536: fourth terminal portion
37, 237, 337, 437, 537: third contact hole
534S, 734S: first division contact hole (division contact hole)
535S, 735S: second division contact hole (division contact hole)
537S: third division contact hole (division contact hole)
DMA: mounting area
FMA: mounting area
GS: glass substrate (substrate)

The invention claimed is:

1. A mounting substrate comprising at least:
a substrate on which a mounting component is mounted;
at least one terminal disposed in a mounting area of the substrate in which the mounting component is mounted, the at least one terminal being connected to the mounting component;
a first terminal portion made of a first conductive film disposed on the substrate and included in the at least one terminal;
a first insulation film disposed on an upper layer side of the first conductive film, the first insulation film including a first contact hole at a position overlapping the first terminal portion;
a second terminal portion made of a second conductive film disposed on an upper layer side of the first insulation film and included in the at least one terminal, the second terminal portion being disposed to overlap at least the first contact hole and an opening edge of the first contact hole, and the second terminal portion being connected to the first terminal portion via the first contact hole;
a second insulation film disposed on an upper layer side of the second conductive film, the second insulation film including a second contact hole at a position overlapping the second terminal portion and not overlapping the first contact hole;
a third terminal portion made of a third conductive film disposed on an upper layer side of the second insulation film and included in the at least one terminal, the third terminal portion being disposed to overlap at least the second contact hole and an opening edge of the second contact hole, the third terminal portion being connected to the second terminal portion via the second contact hole;

a third insulation film disposed on an upper layer side of the third conductive film, the third insulation film including a third contact hole at a position overlapping the third terminal portion; and a fourth terminal portion made from a fourth conductive film disposed on an upper layer side of the third insulation film and included in the at least one terminal, the fourth terminal portion being disposed to overlap the third contact hole and an opening edge of the third contact hole, and connected to the third terminal portion via the third contact hole.

2. The mounting substrate according to claim 1, wherein the at least one terminal has an elongated shape, and the first insulation film and the second insulation film are formed such that the first contact hole and the second contact hole are along a longitudinal direction of the at least one terminal.

3. The mounting substrate according to claim 1, wherein the first terminal portion is disposed to overlap the second contact hole.

4. The mounting substrate according to claim 1, wherein the third terminal portion is disposed to overlap the first contact hole.

5. The mounting substrate according to claim 1, wherein the first conductive film and the second conductive film are metal films, the third conductive film is a transparent electrode film, and the first insulation film and the second insulation film are formed such that an opening area of the second contact hole is larger than an opening area of the first contact hole.

6. The mounting substrate according to claim 1, wherein the first insulation film and the second insulation film are formed such that at least any one of the first contact hole and the second contact hole includes a plurality of division contact holes arranged at intervals.

7. The mounting substrate according to claim 1, wherein the first insulation film, the second insulation film, and the third insulation film are formed such that the first contact hole, the second contact hole, and the third contact hole do not overlap one another.

8. The mounting substrate according to claim 7, wherein the first conductive film and the second conductive film are metal films, the third conductive film and the fourth conductive film are transparent electrode films, and the first insulation film, the second insulation film, and the third insulation film are formed such that an opening area of the first contact hole is the smallest and an opening area of the third contact hole is the largest.

9. The mounting substrate according to claim 1, wherein the third insulation film is formed such that the third contact hole overlaps at least the second contact hole.

10. The mounting substrate according to claim 9, wherein the third conductive film and the fourth conductive film are transparent electrode films, and the third insulation film is formed such that the third contact hole overlaps the first contact hole.

11. The mounting substrate according to claim 1, wherein the at least one terminal includes an input terminal for inputting a signal to the mounting component and an output terminal for outputting the signal from the mounting component, and at least the output terminal includes at least the first terminal portion, the second terminal portion, and the third terminal portion.

12. The mounting substrate according to claim 2, wherein the third conductive film and the fourth conductive film are transparent electrode films, the first contact hole and the second contact hole do not overlap each other, the third contact hole has a formation area that straddles the first contact hole and the second contact hole arranged along the longitudinal direction of the at least one terminal, and the third contact hole has an elongated shape and overlaps entire areas of the first contact hole and the second contact hole.

13. The mounting substrate according to claim 12, wherein the first contact hole and the second hole respectively have an elongated shape, and the third contact hole has a long side dimension that is smaller than a long side dimension of the at least one terminal and is two-times of or larger than each of long side dimensions of the first contact hole and the second contact hole.

14. A display panel comprising:

the mounting substrate according to claim 1; and a counter substrate disposed to face the mounted substrate.

* * * * *